(12) United States Patent
Mankbadi

(10) Patent No.: US 12,030,660 B2
(45) Date of Patent: Jul. 9, 2024

(54) SYSTEMS AND METHODS FOR SUPRESSING NOISE FROM AN AIRCRAFT ENGINE

(71) Applicant: Embry-Riddle Aeronautical University, Inc., Daytona Beach, FL (US)

(72) Inventor: Reda R. Mankbadi, Winter Springs, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 334 days.

(21) Appl. No.: 17/314,178

(22) Filed: May 7, 2021

(65) Prior Publication Data

US 2021/0371119 A1 Dec. 2, 2021

Related U.S. Application Data

(60) Provisional application No. 63/032,056, filed on May 29, 2020.

(51) Int. Cl.
| | |
|---|---|
| *B64D 33/00* | (2006.01) |
| *B64C 1/00* | (2006.01) |
| *B64C 1/40* | (2006.01) |
| *F02F 1/00* | (2006.01) |
| *F02K 1/34* | (2006.01) |
| *F02K 1/46* | (2006.01) |

(52) U.S. Cl.
CPC ............ *B64D 33/06* (2013.01); *B64C 1/403* (2013.01); *F02K 1/46* (2013.01)

(58) Field of Classification Search
CPC .......... B64D 33/00; B64D 33/06; B64C 1/00; B64C 1/40; B64C 1/403; F02F 1/00; F02F 1/40; F02F 1/46
See application file for complete search history.

(56) References Cited

U.S. PATENT DOCUMENTS

| | | | |
|---|---|---|---|
| 10,724,472 B1* | 7/2020 | Chase | B64D 29/00 |
| 2016/0130011 A1* | 5/2016 | Moore | B64D 33/06 |
| | | | 239/265.17 |

OTHER PUBLICATIONS

Mankbadi, Reda R. and Salehian, Saman; Embry-Riddle Aeronautical University, Daytona Beach, FL 32114, USA; *An Airframe Wavy Shield for Reduction of Supersonic Noise Via NonLinear Mode-Interaction*; American Institute of Aeronautics and Astronautics, Inc.; 11-15 & Jan. 19-21, 2021, Virtual Event; American Institute of Aeronautics and Astronautics, Inc. Scitech 2021 Forum.

(Continued)

*Primary Examiner* — Daniel McNally
(74) *Attorney, Agent, or Firm* — Womble Bond Dickinson (US) LLP

(57) ABSTRACT

Systems and methods for noise suppression for aircraft are disclosed. The aircraft may include a fuselage. The aircraft may include a plurality of wings connected to or formed with the fuselage. The aircraft may include at least one engine configured to generate a propulsion force to propel the aircraft. The at least one engine may include a nozzle assembly having a nozzle body with an outlet that releases an exhaust air or a jet flow. The aircraft may include a noise suppression assembly. The noise suppression assembly may be configured to interact with the exhaust air or jet flow to substantially suppress, mitigate, reduce, or otherwise modify noise generated by the aircraft.

9 Claims, 23 Drawing Sheets

(56) References Cited

OTHER PUBLICATIONS

Mankbadi, Reda R. and Salehian, Saman; Embry-Riddle Aeronautical University, Daytona Beach, FL 32114, USA; *A proposed wavy shield for suppression of supersonic jet noise utilizing reflections*; International Journal of Aeroacoustics 2021, vol. 20(1-2) 4-34; journals.sagepub.com/home/jae.
Salehian, S. and Mankbadi, RR.; Jet noise in airframe integration and shielding; Appl Sci 2020; 10:511; www.mdpi.com/journal/applsci.
Mora P, Baier F, Kailasanath K et al.; Acoustics from a rectangular supersonic nozzle exhausting over a flat surface; J Acoust Soc Am 140(6), Dec. 2016; 2016 Acoustical Society of America [http://dx.doi.org/10.1121/1.4967158]; 4130-4141.
Arbey H. and Williams J.E. FFowes; Active cancellation of pure tones in an excited jet; J Fluid Mech 1984; 149; 445-454; Printed in Great Britain.
Mankbadi Reda R.; On the interaction between fundamental and subharmonic instability waves in a turbulent round jet; J Fluid Mech 1985; 160: 385-419; Printed in Great Britain.

\* cited by examiner

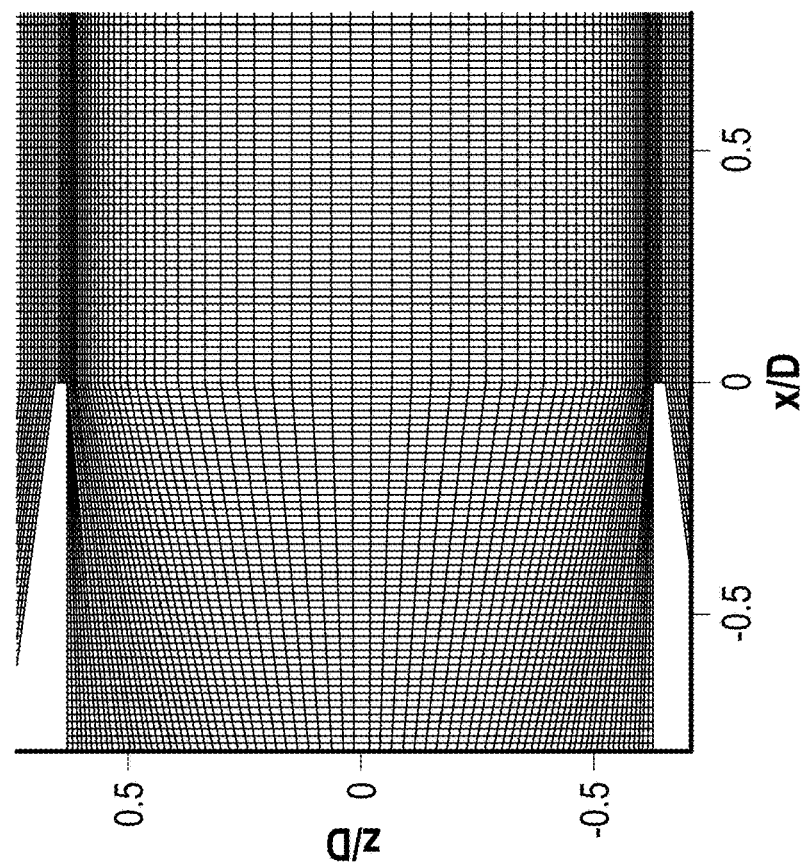
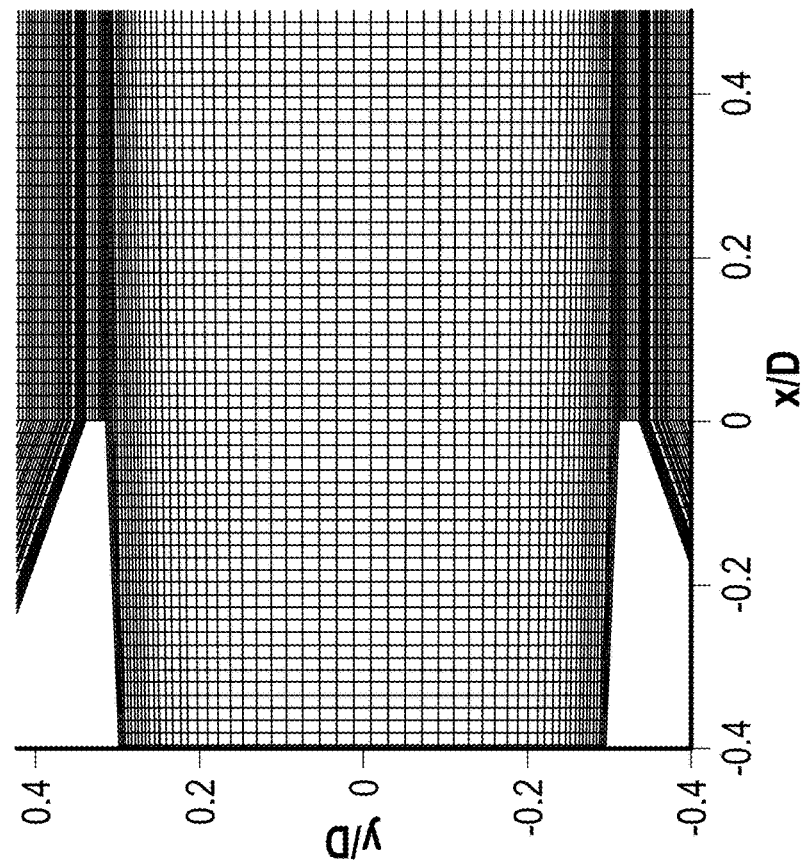
Fig. 3(a)
Fig. 3(b)

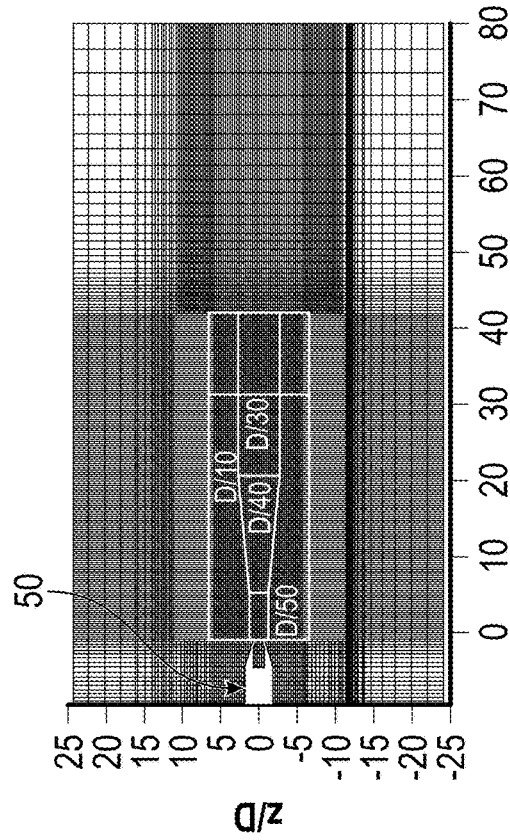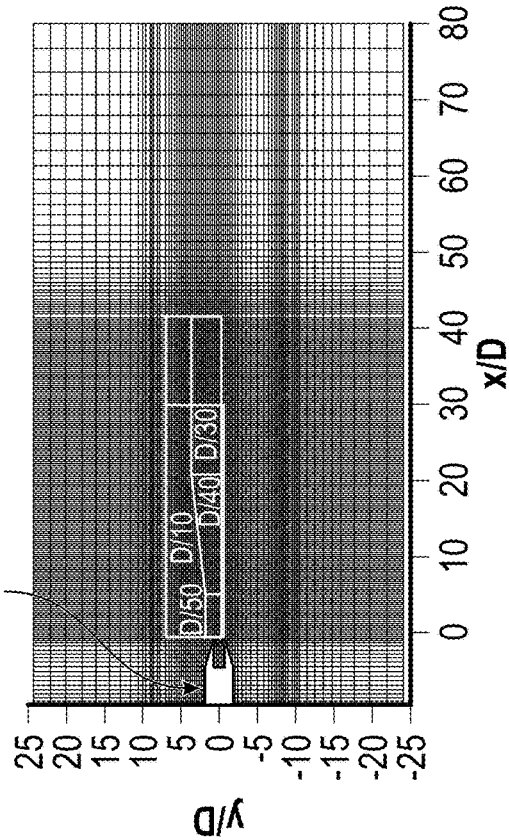
Fig. 4(a)    Fig. 4(b)
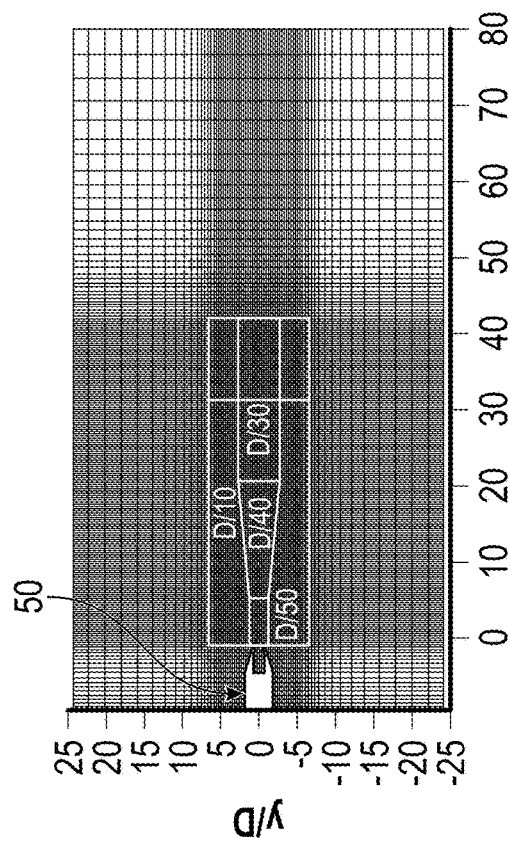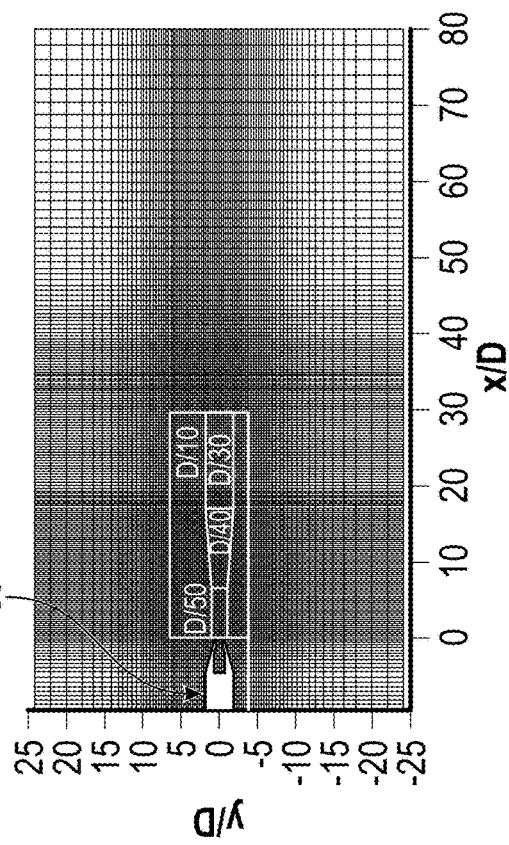
Fig. 5(a)    Fig. 5(b)

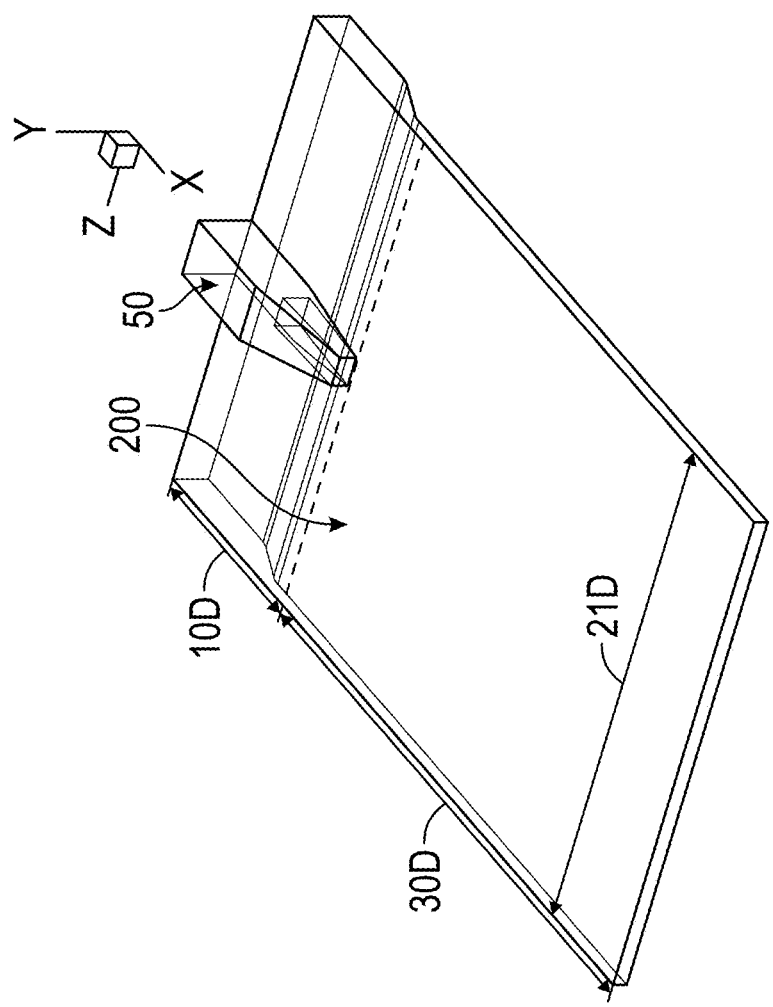
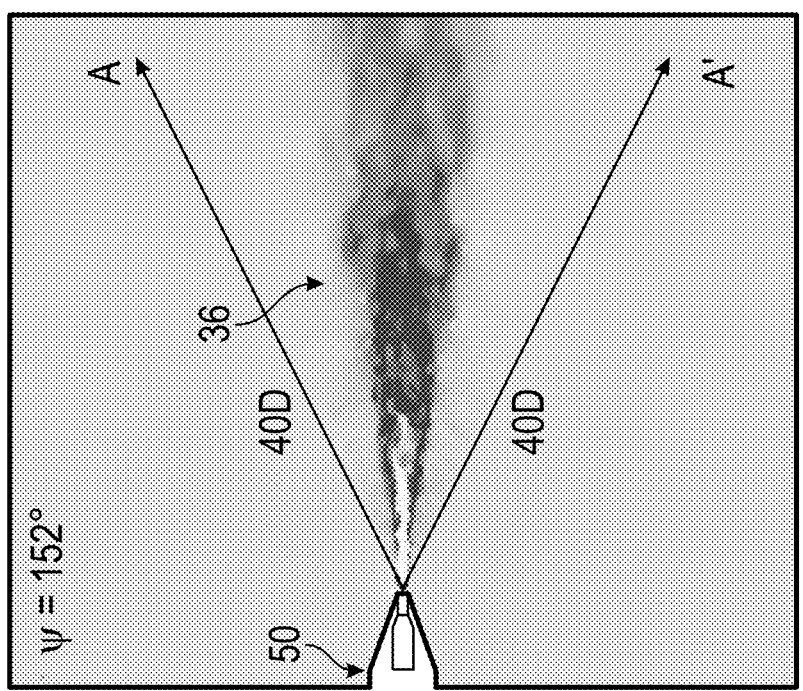
Fig. 9

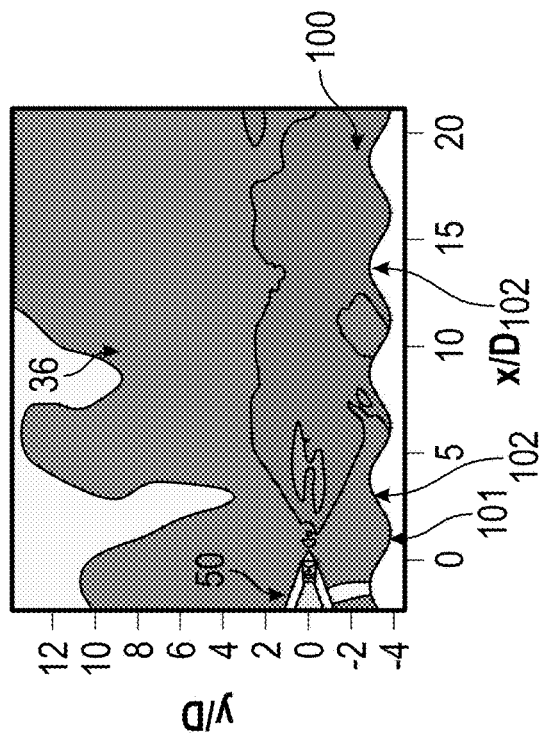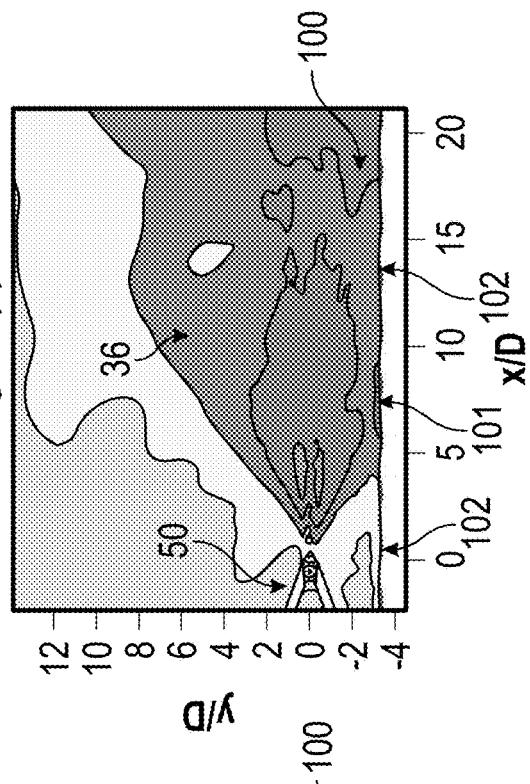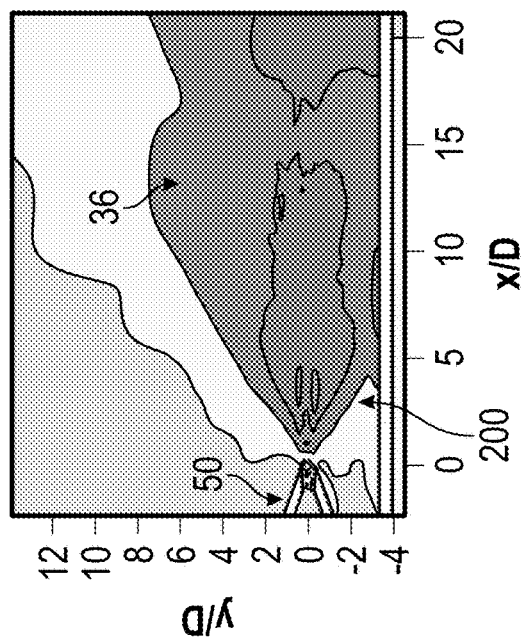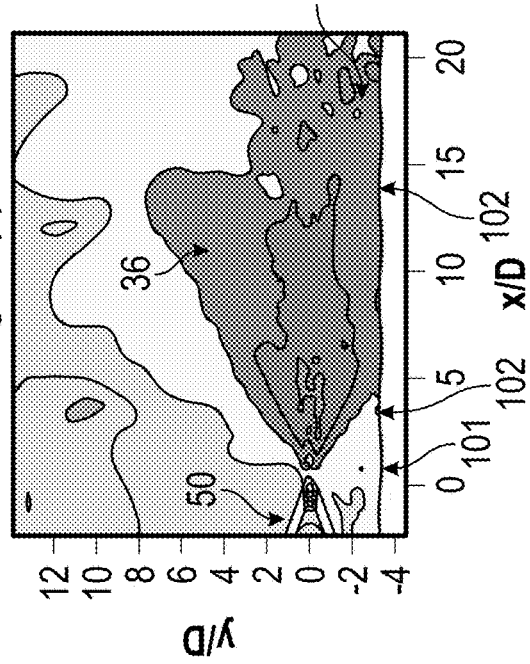

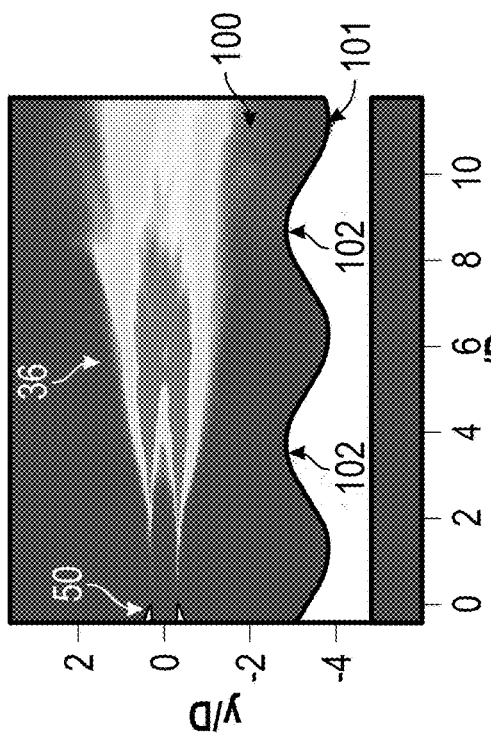
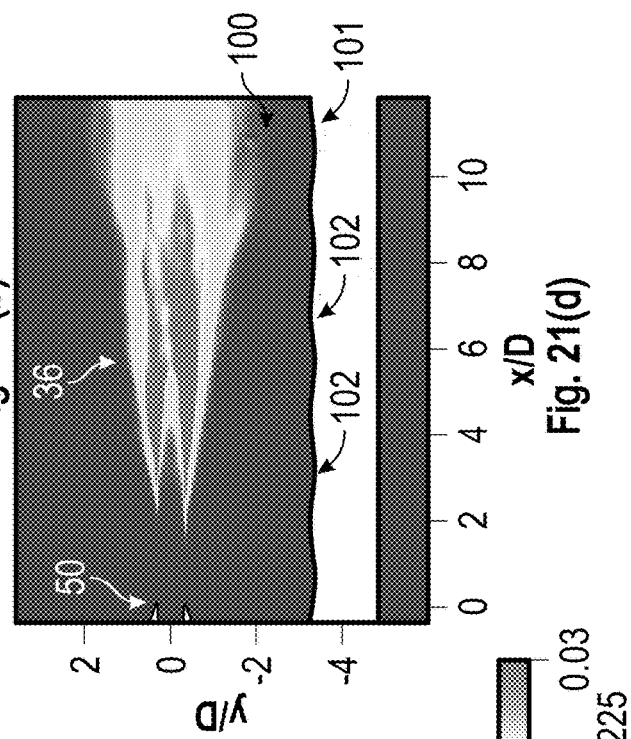
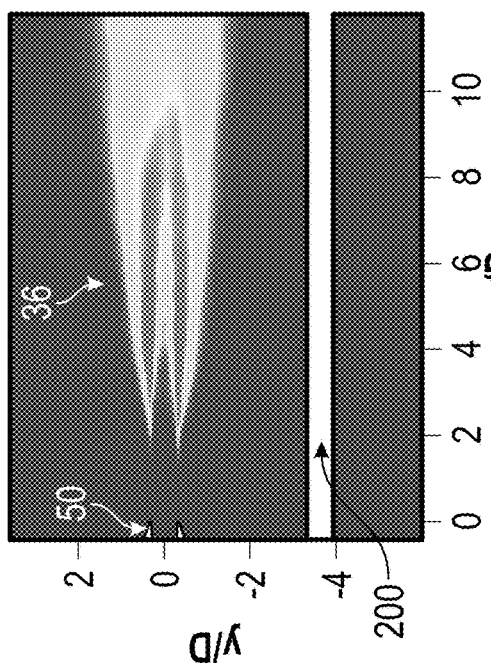
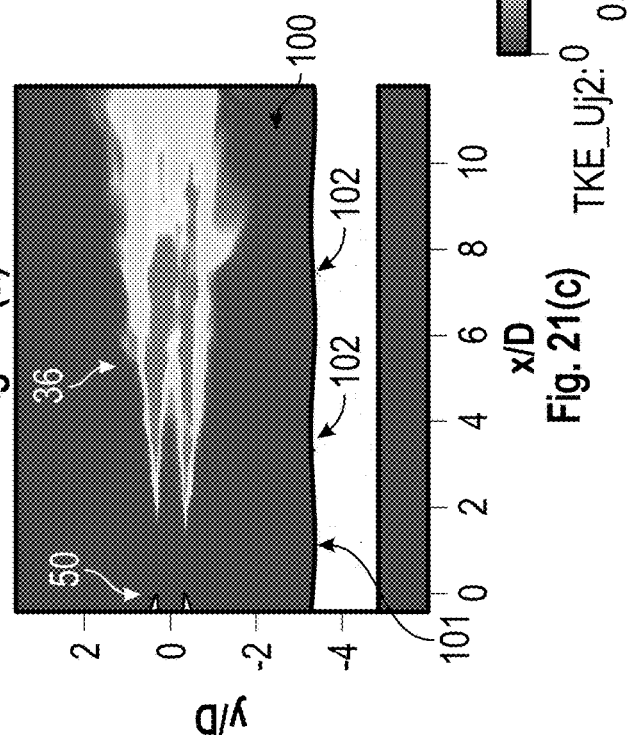

SYSTEMS AND METHODS FOR SUPRESSING NOISE FROM AN AIRCRAFT ENGINE

REFERENCE TO RELATED APPLICATION

The present Patent application claims the benefit of pending U.S. Provisional Patent Application No. 63/032,056, filed on May 29, 2020.

INCORPORATION BY REFERENCE

The disclosures made in U.S. Provisional Patent Application No. 63/032,056, filed on May 29, 2020 are specifically incorporated by reference herein as if set forth in their entireties.

TECHNICAL FIELD

The present disclosure generally is directed to aerial vehicles, and in one aspect, noise suppression for aerial vehicles, such as jet aircraft or other manned or unmanned aerial vehicles. Other aspects also are described.

BACKGROUND

Aircraft noise can be affected by the presence of solid surfaces along the structure of an aircraft, in the vicinity of one or more jet engines installed on the aircraft, including but not limited to, the wing, high-lift devices, fuselage, the runway surface during take-off, and/or other surfaces. Accordingly, there have been numerous experimental investigations of jet-surface interactions targeting various conceptual design of future commercial transport in order to meet specific goals related to noise. Researchers have investigated the interaction between a free jet and a reflective surface, representing a wing, and observed low frequency augmentation and high frequency increase. Tests also have been conducted to study the propulsion/airframe integration, while others have focused on the noise generation mechanism in subsonic jets and the effect of the surface length and the distance from the nozzle lip to a reflective surface, typically referred to as (hID), where D is the hydraulic diameter of the nozzle exit and h is the distance from the nozzle to the surface.

In addition, tests have been done on rectangular jets of various Aspect Ratios (AR) in the proximity of a flat surface, in which measurements at a polar angle of 90°, showed a reduction of the noise on the shielded side, specifically for high frequencies (St>0.1)—where St is the Strouhal number based on jet exit diameter and velocity. Other experimental and numerical studies have been conducted on a 1.5 Mach jet at various distances from a flat surface and observed that both scrubbing and trailing edge noise in low frequencies increased, as the distance between the flat surface and the jet is reduced. Whereas, some others provided flow field and acoustic data for a supersonic round jet with a design Mach number of 1.5, in which a surface or plate was placed at a radial distance h, and tested a range of distances between $0.5 \leq h/D \leq 5$ and observed noise reduction. Even further, a supersonic rectangular nozzle of 2:1 aspect ratio and 1.5 Mach number has been tested with and without a surface or plate for various nozzle expansion conditions. In this study, the surface or plate was positioned at different stand-off distances, starting where the surface or plate touches the inner wall of the nozzle exit at h/D=0, and could be moved away from the jet up to h/D=4. It was reported that h/D=1 to h/D=3 have similar Overall Sound Pressure Levels (OASPL) compared to the no-plate configuration, while the h/D=0 configuration increases noise levels significantly.

Still further, numerical simulations have been carried out to study the shielding effect on jets. For instance, some researchers used Unsteady Reynolds Averaged Simulations (URANS) to study the installation geometry effects on flow field and acoustics, while others performed an implicit Large Eddy Simulation (LES) on subsonic jets. More recently, the Lattice-Boltzmann Method has been used to simulate interaction between a subsonic jet and a flat plate placed outside the plume—showing that strong pressure fluctuations were generated at the trailing-edge of the surface or plate and then propagate to the far-field as acoustic waves.

However, a need still exists for improved systems and methods for suppressing jet noise in aircraft.

SUMMARY

Briefly described, the present disclosure is directed to systems and methods for noise suppression, mitigation, or reduction for an engine or engines of an aircraft, such as a supersonic jet aircraft or other suitable aerial vehicles, e.g., subsonic aircraft or other manned or unmanned aerial vehicles.

In one aspect, the present disclosure provides systems and methods for noise suppression, mitigation, or reduction for an engine or engines of an aircraft, including a noise suppression assembly having a wall or surface configured with a non-linear or wavy pattern to reflect the incoming near-field flow and acoustic perturbations into waves of a particular dominant frequency. The reflected waves will then excite the corresponding frequency of the large-scale structure in the initial region of the jet's shear layer. By designing the frequency of the reflected waves to be the harmonic of the fundamental frequency that corresponds to the radiated peak noise, the two frequency-modes interact nonlinearly. With the appropriate phase difference, the harmonic dampens the fundamental as it extracts energy from it to amplify. The outcome is a reduction in the peak noise; for example, in embodiments, the noise suppression assembly of the present disclosure can provide a reduction in jet noise by as much as 4 dB greater than a noise reduction provided by a flat surface.

In particular, according to embodiments of the present disclosure, systems and methods are disclosed for suppressing, mitigating and/or reducing noise generated by one or more engines of an aircraft, which generally can include a fuselage or main body section, and a plurality of wings, or wing portions, attached to or formed with, the fuselage and configured to facilitate generation of lift forces for the aircraft. The aircraft will include one or more engines coupled to the fuselage or the wings of the aircraft. The one or more engines will be configured to generate propulsive forces for propulsion or driving of the aircraft. In one construction, the one or more jet engines can include one or more top-mounted engines positioned along a top or upper portion of the fuselage, or the wings. In additional or in alternative constructions, however, the aircraft can include one or more bottom mounted engines that are positioned along a bottom or lower portion of the aircraft.

The one or more engines further can include jet engines having an engine housing or body including an inlet section and an exhaust section. The engine housing will receive one or more fans, one or more compressors, a combustor (e.g., with a combustion chamber), one or more turbines, and can include an afterburner, etc., for pulling a free stream of air into the intake and releasing a controlled jet flow, also referred to as a jet or jet exhaust plume, from the exhaust section to generate a propulsion force or thrust for driving propulsion of the aircraft. The exhaust section can have a nozzle assembly that is coupled to, or formed with, the engine housing or other portion of the engine. The nozzle assembly can include a nozzle body with a passage or air flow path defined through of the nozzle body and an outlet at an aft or rear end of the nozzle body that releases the jet flow therefrom.

The aircraft also will include a noise suppression assembly or system that is configured to substantially suppress, mitigate, reduce, or otherwise modify noise generated by the one or more engines of the aircraft. The noise suppression assembly will be configured to modify flow properties, mechanisms, etc. of one or more regions or portions of the jet flow to help to suppress noise generated by the aircraft. For example, the noise suppression assembly can cause or otherwise introduce flow perturbations due to flow-surface interactions and/or reflections of near-field acoustic waves of the jet as they are impacted on the surface to thereby introduce perturbations or disruptions in one or more portions or regions of the exhaust jet flow exiting the nozzle assembly of the engine(s), resulting in substantial noise suppression thereof.

The noise suppression assembly generally will be provided along, or can be included as part of, an outer airframe area or portion of the aircraft, such as along or part of a portion of the fuselage or wing(s). In one aspect, the noise suppression assembly will be arranged aft of or behind the nozzle assemblies of the engines. For example, a separate noise suppression assembly can be arranged adjacent and behind the nozzle assembly of each engine of the aircraft, being sized and located along the aircraft surface so as to receive and disturb an exhaust air flow from an associated engine. Alternatively, in some embodiments, a larger noise suppression assembly or area can be arranged behind and be associated with multiple engines.

In certain embodiments, the noise suppression assembly can include a suppressing surface or wall that is generally non-linear. Specifically, the suppressing surface or wall can have one or more surface portions, features, etc. configured to interact with one or more portions of the jet flow to facilitate or otherwise help with noise suppression of the one or more engines. Such surface portions, features, etc. can include at least one surface or wall shaped, dimensioned, arranged, and/or otherwise configured such that exhaust air/jet flows pass thereover and are disturbed, deflected, or otherwise have perturbations introduced in one or more regions or portions, e.g., an initial region, of the jet flow released an associated engine nozzle. This disturbance or introduction of perturbations into the exhaust air/jet flows facilitates variation and/or breaking apart of the pressure waves created by the exhaust air/jets flows so as to modify or otherwise affect the noise-generating, structure thereof.

In one exemplary construction, the series of surface portions can include a plurality of undulations, waves, or other spaced protrusions or protuberances projecting from a surface, with a plurality of spaced recessed portions or valleys defined between the protrusions. For example, in some constructions, there are alternating protrusions and recessed portions spaced along the at least one surface, which spacing's can be substantially consistent or uniform, or can be varied, i.e. the protrusions closer to the engine nozzle can be closer together, can have larger recessed portions or valleys therebetween, and/or can be arranged with other variations.

The undulations, waves, or other protrusions can have a generally curved shape or configuration, and the recessed portions or valleys can have a corresponding generally curved shape or configuration, and in combination, the protrusions and recessed portions can define or provide a generally wavy suppressing surface or wall. The curved shape of the undulations, waves, or other protrusions and recessed portions or valleys can have a variable or changing slope or curvature, though the curved shaped can have a substantially continuous slope or curvature without departing from the scope of the present disclosure.

In one embodiment, the protrusions and recesses can be shaped or configured such that the wavy surface has a substantially continuous simple, sinusoidal wave profile or undulating configuration, though other wave profiles are possible without departing from the scope of the present disclosure. The sinusoidal wave profile can include selected features, parameters, etc. (e.g., wavelength, amplitude, phase shift, etc.) to generate specific interactions (e.g., non-linear interactions) between the jet flow and its harmonic to reduce the net noise source and total radiated noise from the aircraft. For example, the wave profile can cause, or otherwise introduce, flow perturbations due to flow-surface interactions and/or reflections of near-field acoustic waves of the jet as they are impacted on the suppressing surface to thereby introduce the perturbations in the initial region of the jet, resulting in substantial noise suppression. As such, with embodiments of the present disclosure, the noise suppression assembly can reduce noise of the aircraft (e.g., in comparison to similarly constructed aircraft without the noise suppression assembly) as much as about 2 dB, about 5 dB, or more, especially in peak frequency.

In some constructions, the one or more engines can be positioned (e.g., supported by a support structure along the fuselage), with the nozzles spaced sufficiently away from the suppressing surface of the aircraft—e.g., the nozzles can be positioned to have a significant distance between the jet flow released therefrom and the suppressing surface. In additional or alternative constructions, the nozzle can be integrated with the noise suppression assembly or otherwise positioned to have a relatively small or minimal clearance between the nozzle and the suppressing surface. That is, a distance between the nozzle outlet and jet flow therefrom and suppressing surface can be very small in a tight integrated design.

These and other advantages and aspects of the embodiments of the disclosure will become apparent and more readily appreciated from the following detailed description of the embodiments and the claims, taken in conjunction with the accompanying drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the embodiments of the present disclosure, are incorporated in and constitute a part of this specification, illustrate embodiments of the invention, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

FIG. 3(a) and FIG. 3(b) show a planar cut of a computational grid near nozzle exit, (a) minor plane, (b) major plane.

FIG. 4(a) and FIG. 4(b) show a planar cut of a computational domain of the baseline case, (a) minor plane, (b) major plane.

FIG. 5(a) and FIG. 5(b) show a planar cut of the computational domain of the shielded case in x-y plane, (a) (h/D=3), (b) (h/D=0).

FIG. 9 shows schematics of the microphone probe locations and the directivity arc line.

FIGS. 20(a)-(d) show nearfield sound pressure level (SPL) for (a) a flat plate, (b) example wavy embodiment 1, (c) example wavy embodiment 2, (d) example wavy embodiment 3.

FIGS. 21(a)-(d) show a turbulent Kinetic Energy normalized by jet velocity squared for (a) a flat plate, (b) example wavy embodiment 1, (c) example wavy embodiment 2, and (d) example wavy embodiment 3.

DETAILED DESCRIPTION

The following description is provided as an enabling teaching of embodiments of this disclosure. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the embodiments of the present disclosure and not in limitation thereof.

Figure 1A:
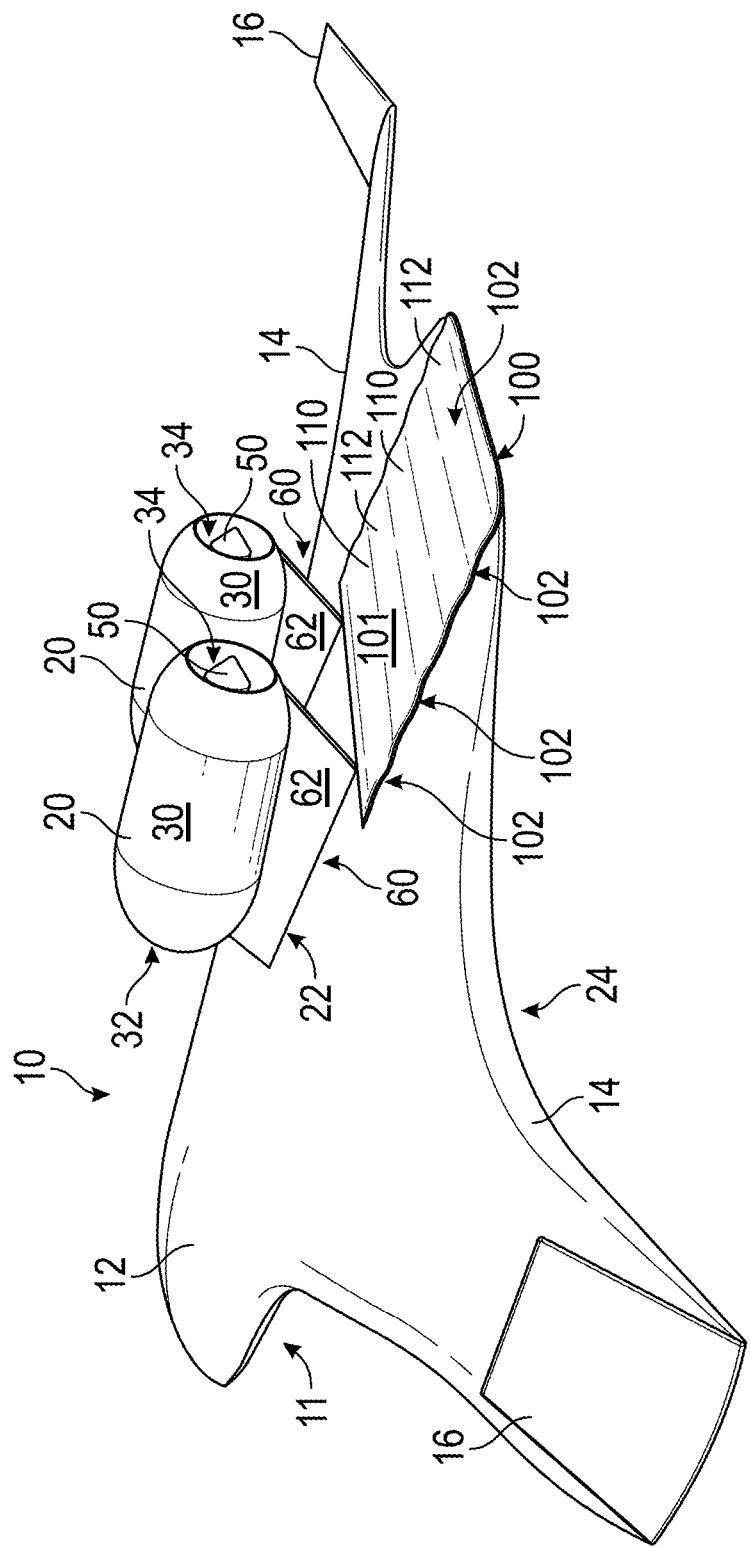
FIG. 1(a) and FIG. 1(b) show perspective views of exemplary aircraft according to principles of the present disclosure.

As shown in FIG. 1(a), an aircraft 10, such as a jet aircraft, includes a noise suppression assembly 100, system, or mechanism that is configured to substantially suppress, mitigate, reduce, or otherwise modify noise generated by the aircraft 10. The aircraft 10 can include a supersonic or hypersonic jet aircraft, however, the noise suppression assembly 100 can be part of, or otherwise used in conjunction with, other suitable aircraft or aerial vehicles, e.g., subsonic jet aircraft or other suitable manned, or unmanned, aerial vehicles. Additional exemplary aircraft constructions 10A-10D that can include or otherwise employ the noise suppression assembly 100 are shown in FIGS. 22(a)-(d).

FIG. 1(a) further indicates that the aircraft 10 generally can include an airframe 11. The airframe 11 can include a fuselage 12 or main body section. The fuselage 12 can include or at least partially define a cockpit or other suitable chamber(s) for pilots and/or passengers, for manned flight of the aircraft 10. The aircraft 10 also could be an un-manned aerial vehicle (UAV), with the fuselage 12 including one or more chambers housing control systems and flight mechanism that facilitate unmanned flight or remote control of the aircraft 10. The fuselage 12 can be made from synthetic or composite materials, such as metallic materials, fiber reinforced polymers, other materials, or some combinations thereof.

As also indicated in FIG. 1(a), the airframe 11 of the aircraft 10 will include wings 14 attached to, or formed with, the fuselage 12 and generally configured to facilitate generation of lift forces for the aircraft 10. The wings 14 can include any suitable wing constructions, such as a swept-back wing construction, a delta wing construction, or other suitable fixed or movable wing constructions or designs as will be understood in the art. In one construction, as indicated in FIG. 1(a), the wings 14 further can include inverted or upturned wing tips 16, though in other constructions, the wings 14 can be substantially straight (as generally indicated in FIGS. 22(a)-(d)). The aircraft 10 further can include one or more tail fins 18 (FIGS. 22(a)-(c)), horizontal stabilizers, and/or other assemblies or components, without departing from the scope of the present disclosure. The wings 14 generally will be made from the same synthetic or composite materials as the fuselage 12, such as metallic materials, fiber reinforced polymer, other material, or some combination thereof.

Figure 1B:
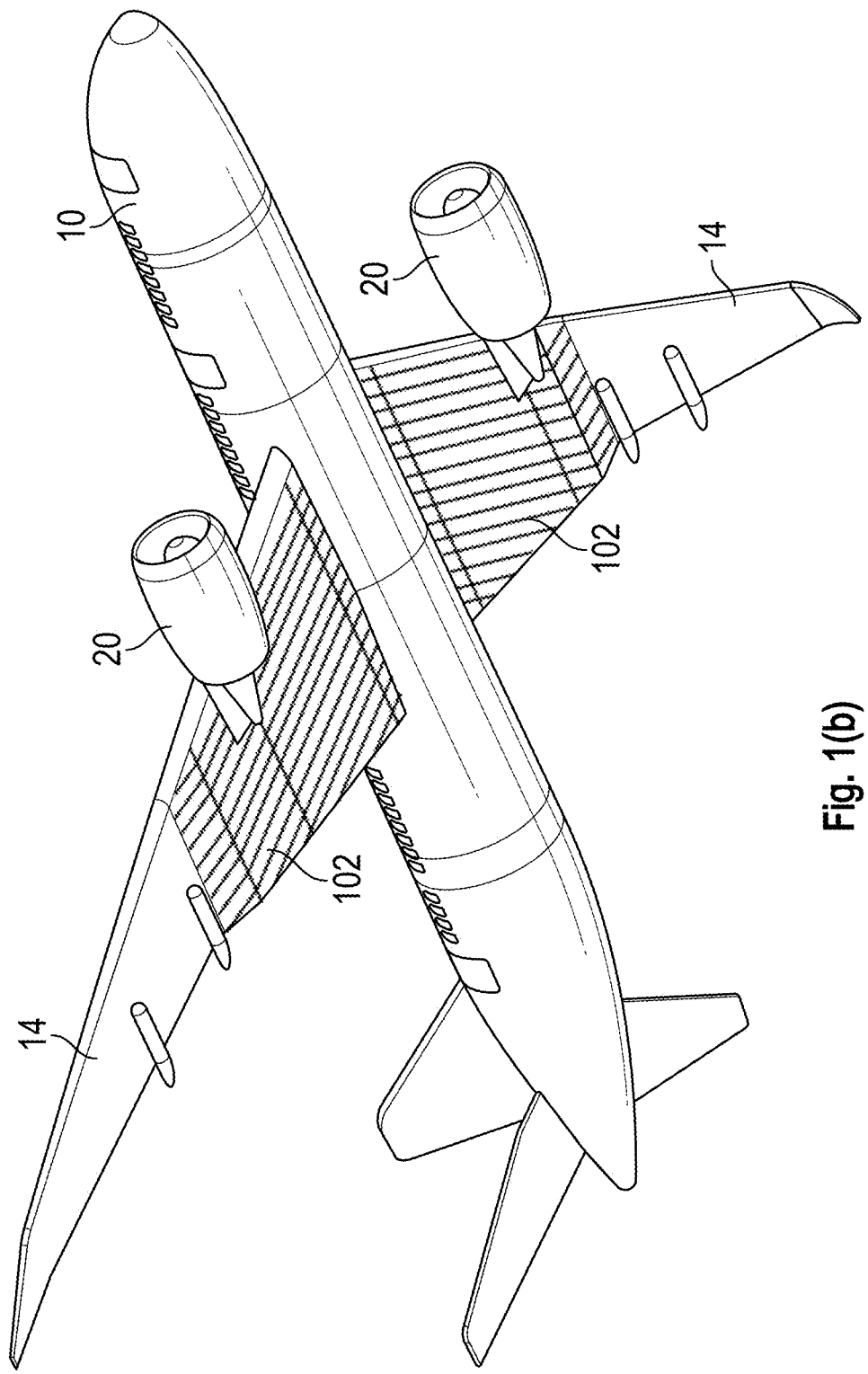

Additionally, as illustrated in FIG. 1(*a*) (and FIGS. 22(*a*)-(*d*)), the aircraft 10 will include one or more engines 20 configured to generate sufficient propulsive forces for propulsion or flight of the aircraft 10. The aircraft 10 can include a plurality of engines 20, such as two side by side engines 20, as shown in FIG. 1(*a*); however, the aircraft 10 can include only a single engine 20, without departing from the scope of the present disclosure. The engines 20 can be coupled to a portion of the fuselage 12, or the wings 14. The engines 20 can be top-mounted engines 20 that are positioned along a top or upper portion 22 of the fuselage 12 (or at least partially along a top or upper portion of the wings 14 of the aircraft); however, in addition or in the alternative, the aircraft 10 can include one or more bottom mounted engines 20 that are positioned along a bottom or lower portion 24 of the aircraft 10 (e.g., a bottom or lower portion of the wings 14 or fuselage 12 as shown in FIG. 22(*c*)).

The engines 20 further can include an engine housing or body 30 including an intake or inlet section 32 and an exhaust section 34. These engines 20 can include jet engines, and for example, the engine housing 30 can house or otherwise be configured to receive one or more fans, one or more compressors, a combustor (e.g., with a combustion chamber), one or more turbines, an afterburner, etc., for pulling a free stream of air into the intake or inlet section 32 and releasing a controlled exhaust air/jet flow 36 (see FIG. 9, FIGS. 19(*a*)-(*d*), FIGS. 20(*a*)-(*d*), and FIGS. 21(*a*)-(*d*)), also referred to as a jet or jet exhaust plume, from the exhaust section 34 to generate a propulsion force or thrust for driving propulsion of the aircraft 10.

Figure 2A:
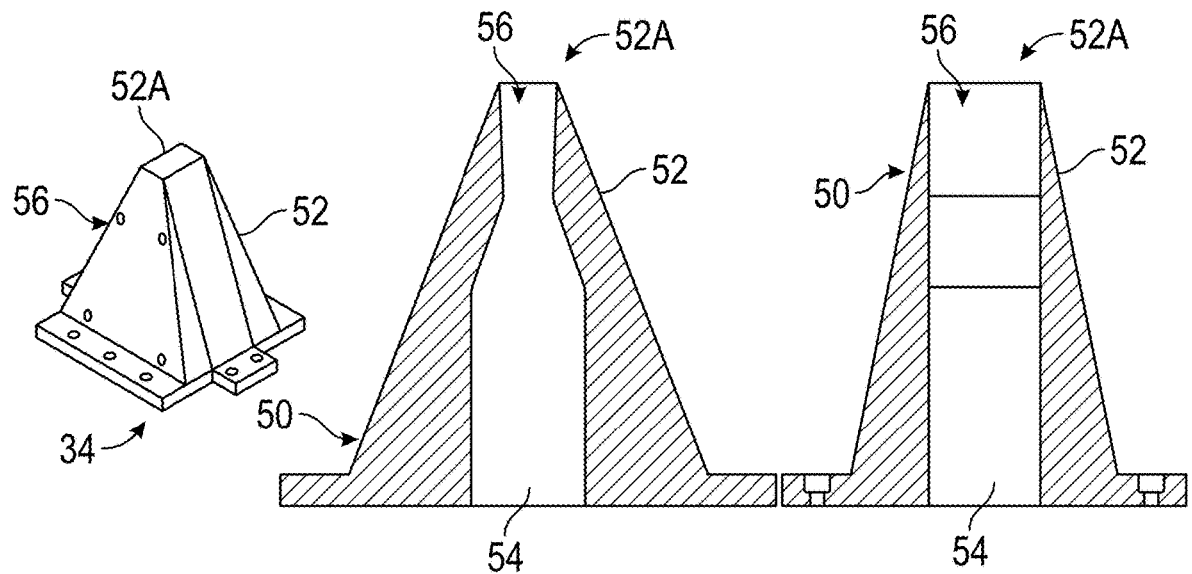
FIG. 2(a) shows perspective and cross-sectional views of an example nozzle geometry (dimensions in meters), FIG. 2(b) an orientation of the noise suppression assembly, and (c) a schematic view of a wavy wall profile of a suppressing surface or wall of the noise suppression assembly, according to examples of the present disclosure.

As further indicated in FIGS. 1 and 2(*a*)-(*c*), the exhaust section 34 can have a nozzle assembly 50 that is coupled to, or formed with, the engine housing 30 (e.g., via fasteners, welding, or other suitable connection mechanism). FIGS. 2(*a*)-(*c*) also indicate that the nozzle assembly 50 can include a nozzle body 52 with a passage or air flow path 54 defined through the nozzle body 52 and an outlet 56 at an aft or rear end 52A of the nozzle body 52 that releases the jet flow therefrom. The nozzle body 52 can have a generally frusto-pyramidal shape or a truncated pyramid shape, with an outlet 56, which, in one embodiment illustrated, can have a generally rectangular configuration, though other shapes or possible, such as conical or frusto-conical bodies/shapes having circular or otherwise arcuate outlets, without departing from the scope of the present disclosure.

By way of example, in one embodiment, the outlet 56 can have a width along a minor axis in a range of about 0.008 m to about 0.015 m, such as about 0.01295 m, and a width along a major axis in a range of about 0.020 m to about 0.030 m, such as about 0.0259 m. It will be understood by those skilled in the art that other, varied dimensions, including larger or smaller widths, also are possible without departing from the scope of the present disclosure. The nozzle body 52 can be made from synthetic or composite materials, such as metallic materials, fiber reinforced polymer, other materials, or some combination thereof. FIG. 2(*a*) shows a 2:1 aspect ratio rectangular nozzle assembly 50 with a C-D profile. The nozzle assembly's 50 area ratio is 1.18 with a design Mach number of 1.5, which corresponds to a nozzle pressure ratio (NPR) of 3.67. The nozzle assembly 50 is sharply C-D in the cross-sectional minor axis plane, as illustrated in FIG. 2(*a*).

The aircraft 10 also includes the noise suppression assembly 100 configured to substantially suppress, mitigate, reduce, or otherwise modify noise generated by the aircraft, as indicated in FIGS. 1 and 2(*b*)-(*c*). As shown in FIGS. 1 and 2(*b*), the noise suppression assembly 100 is provided along, or can be included as part of, the airframe 11 (e.g., fuselage 12 or wings 14) of the aircraft 10, such as being mounted along or being formed as a part of the top portion 22 thereof. The noise suppression assembly 100 generally is arranged aft or otherwise positioned behind the nozzles 50 (FIGS. 1 and 2(*b*)-(*c*)). The noise suppression assembly 100 also can be located along or as part of a portion of the wings 14 where the engines 20 are mounted thereto. In one aspect, a noise suppression assembly 100 can be provided/associated with the nozzle assembly 50 of each engine 20 of the aircraft 10, being sized and located along the aircraft's surface so as to receive and disturb an exhaust air/jet flow 36 from an associated engine 20. Alternatively, in some embodiments, a larger noise suppression assembly or area can be arranged behind and be associated with multiple engines, as generally illustrated in FIG. 1(*a*).

The noise suppression assembly 100 is configured to modify flow properties, mechanisms, etc. of one or more regions or portions of the jet flow 36 to help to suppress noise generated by the aircraft 10, e.g., as generally shown in FIGS. 2(*b*)-(*c*). For example, the noise suppression assembly 100 can cause or otherwise introduce flow perturbations due to flow-surface interactions and/or reflections of near-field acoustic waves of the jet as they are impacted on the surface to thereby introduce perturbations in one or more portions or regions of the jet flow, resulting in substantial noise suppression thereof. The noise suppression assembly further generally will be formed of the same materials as the material of the airframe of the aircraft.

FIG. 2(*c*) shows that the noise suppression assembly 100 includes a suppressing surface or wall 101 that is generally non-linear. Specifically, the suppressing surface or wall 101 can have one or more surface portions, features, etc. 102 configured to interact with one or more portions of the jet flow 36 to facilitate or otherwise help with noise suppression of the one or more engines 20. The one or more surface portions, features, etc. 102 can include a series of spaced surface portions or features arranged along that least lease one surface or wall 101 that are shaped, dimensioned, arranged, or otherwise configured to cause, or otherwise introduce, perturbations in one or more regions or portions, e.g., an initial region, of the jet flow released from the at least one nozzle to modify or otherwise affect the noise-generating, large-scale structure thereof.

For example, the noise suppression assembly can employ a wavy profile configured such that it can reflect the acoustic waves at a desired frequency and can act as a passive excitation mechanism to reduce the noise more effectively when compared to the flat surface. In some embodiments, a wavy or non-linear surface shield can be provided as part of a top-mounted engine configuration. On the other hand, when the engine 20 of the aircraft 10 is mounted under the wing 14, as illustrated in FIG. 1(*b*), the airframe interaction tends to increase the noise radiation under the aircraft 10. The proposed non-linear or wavy surface profile of the one or more surface portions, features, etc. 102 may also be utilized, in such conventional aircraft designs, to reduce the unwanted installation noise. Dimensions of the proposed non-linear or wavy surface profile can be varied depending on the aircraft and configurations thereof.

In some constructions, the suppressing surface or wall 101 can be formed as part of a wall or portion of the airframe 11, in other retrofit constructions, the suppressing surface or wall 101 can be part of a portion, e.g., a plate or other suitable elongated body, that is connected or coupled to the airframe 11, e.g., via welding, fasteners, or other suitable connection mechanisms. Still further, in some constructions, the portion, e.g., plate or elongated body, can be connected to a lower or upper portion of the engine housing 30.

Figure 2B:
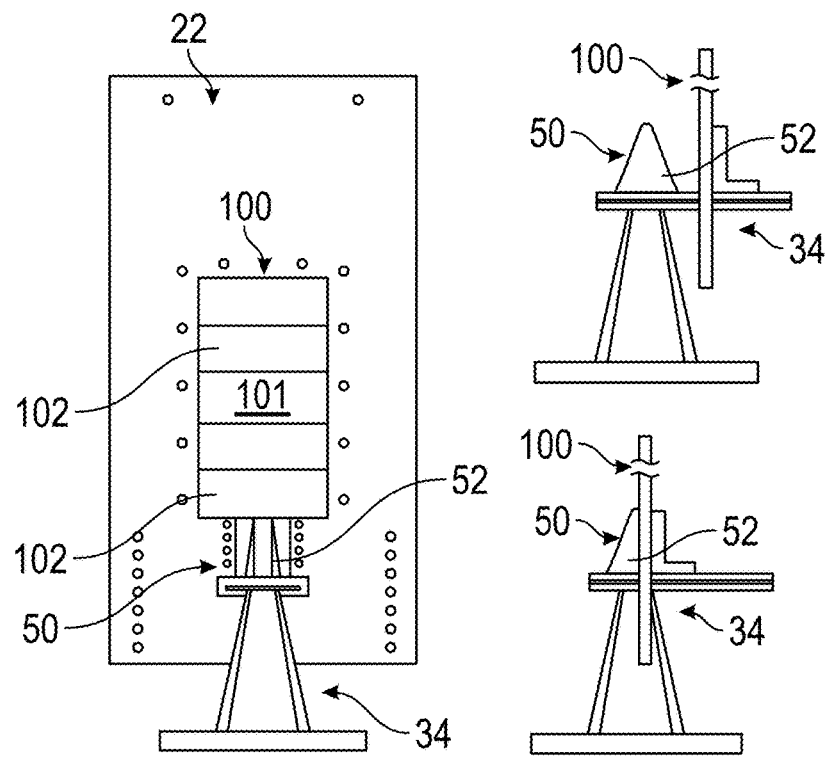
Figure 2C:
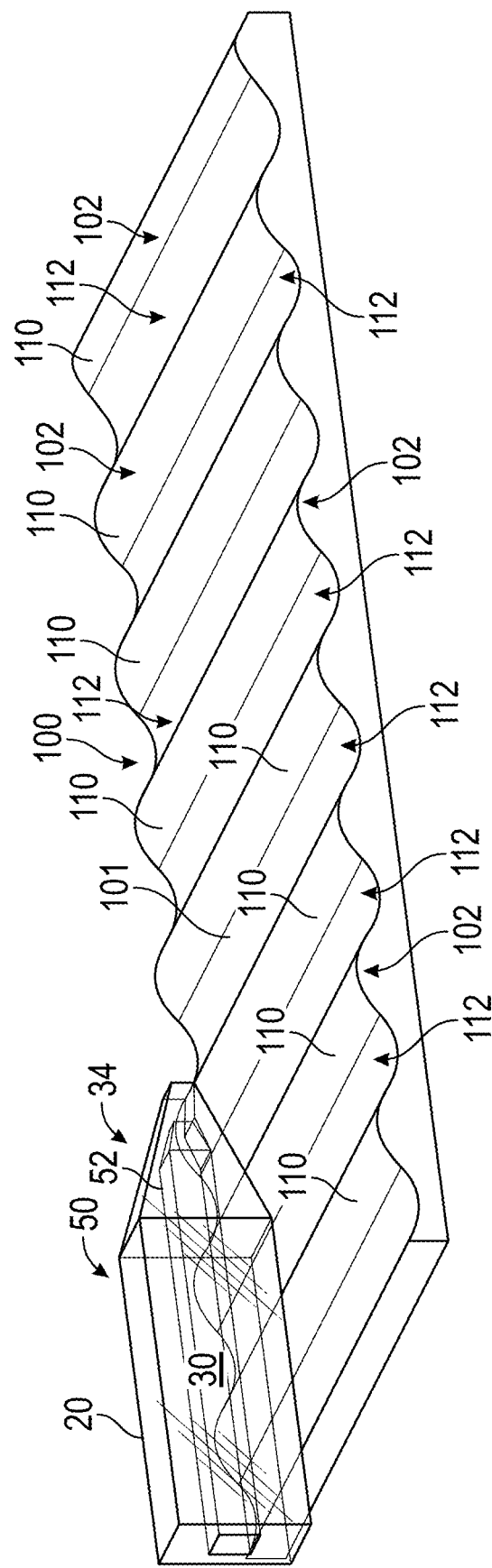

As further indicated in FIG. 2(c), the series of spaced surface portions or features can include a plurality of spaced undulations, waves, or other protrusions 110 and a plurality of spaced recessed portions or valleys 112 adjacent the undulations, waves, or other protrusions 110. For example, the suppressing surface or wall 101 can be configured such that there are alternating undulations, waves, or other protrusions 110 and recessed portions or valleys 112 along the suppressing surface or wall 101. In this regard, the suppressing surface or wall 101 includes recessed portions or valleys 112 arranged in between respective undulations, waves, or other protrusions 110. The undulations, waves, or other protrusions 110 further can have a generally curved shape or configuration, and the recessed portions or valleys 112 can have a corresponding generally curved shape or configuration, and together, the undulations, waves, or other protrusions 110 and recessed portions or valleys 112 can combine to define or provide a generally wavy suppressing surface or wall 101. The curved shape of the undulations, waves, or other protrusions 110 and recessed portions or valleys 112 can have a variable or changing slope or curvature, though the curved shaped can have a substantially continuous slope or curvature without departing from the scope of the present disclosure.

In one embodiment, the undulations, waves, or other protrusions 110 and recessed portions or valleys 112 are shaped or configured such that the wavy surface of the suppressing surface or wall 101 has a substantially continuous simple, sinusoidal wave profile or configuration, though other wave profiles are possible without departing from the scope of the present disclosure. The sinusoidal wave profile can include selected features, parameters, etc. (e.g., wavelength, amplitude, phase shift, etc.) to generate a specific interaction (e.g., non-linear interactions) between the jet flow 36 and its harmonic to reduce the net noise source and total radiated noise from the aircraft. For example, the wave profile can cause, or otherwise introduce, flow perturbations due to flow-surface interactions and/or reflections of near-field acoustic waves of the jet as they are impacted on the suppressing surface or wall 101 to thereby introduce the perturbations in the initial region of the jet, resulting in substantial noise suppression. As such, with embodiments of the present disclosure, the noise suppression assembly 100 can reduce noise of the aircraft 10 (e.g., in comparison to similarly constructed aircraft without the noise suppression assembly) in a range of about 2 dB to about 5 dB or more, especially in peak frequency.

Figure 22A:
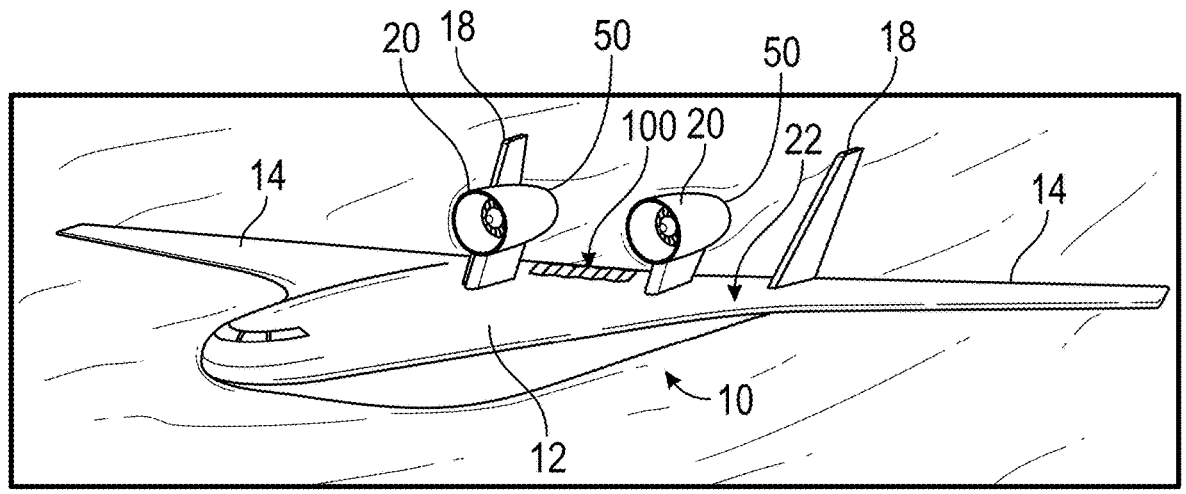
FIGS. 22(a)-(d) illustrate prospective views of various aircraft configurations/constructions that can be employed according to principles of the present disclosure.
Figure 22B:
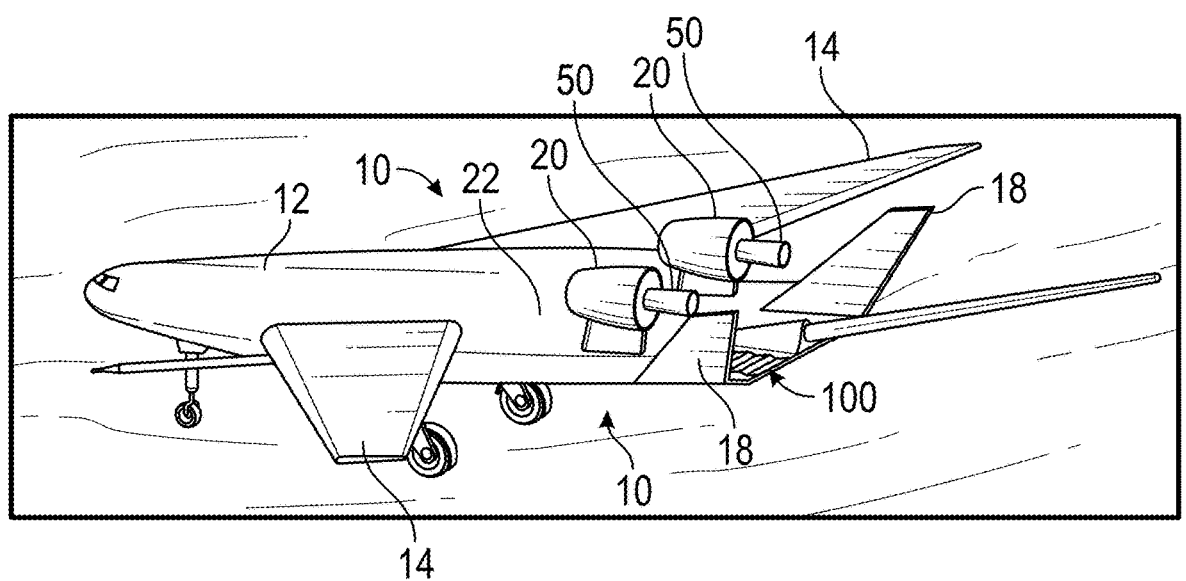
Figure 22C:
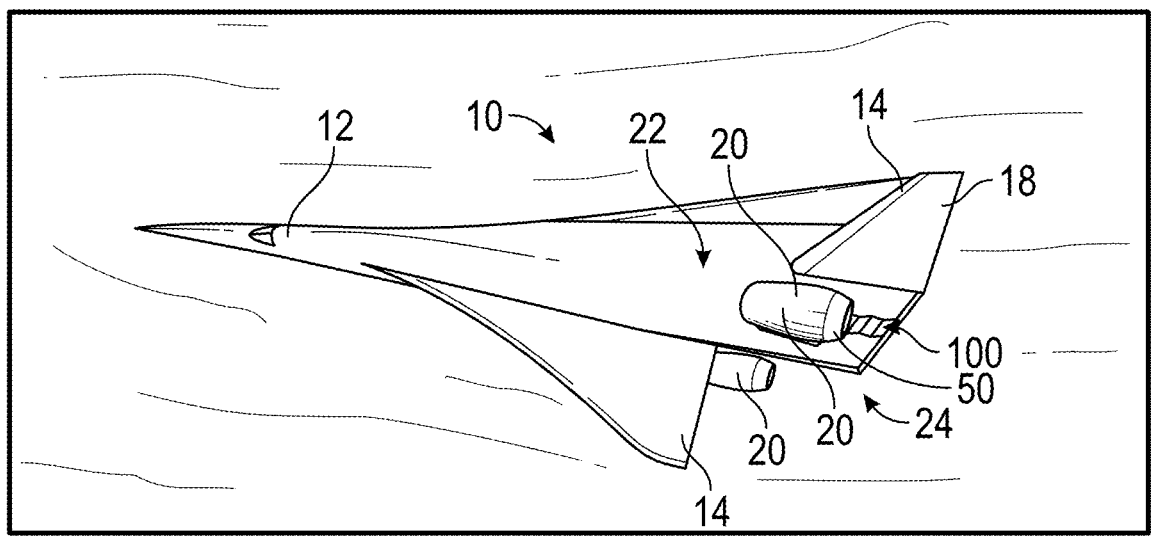
Figure 22D:
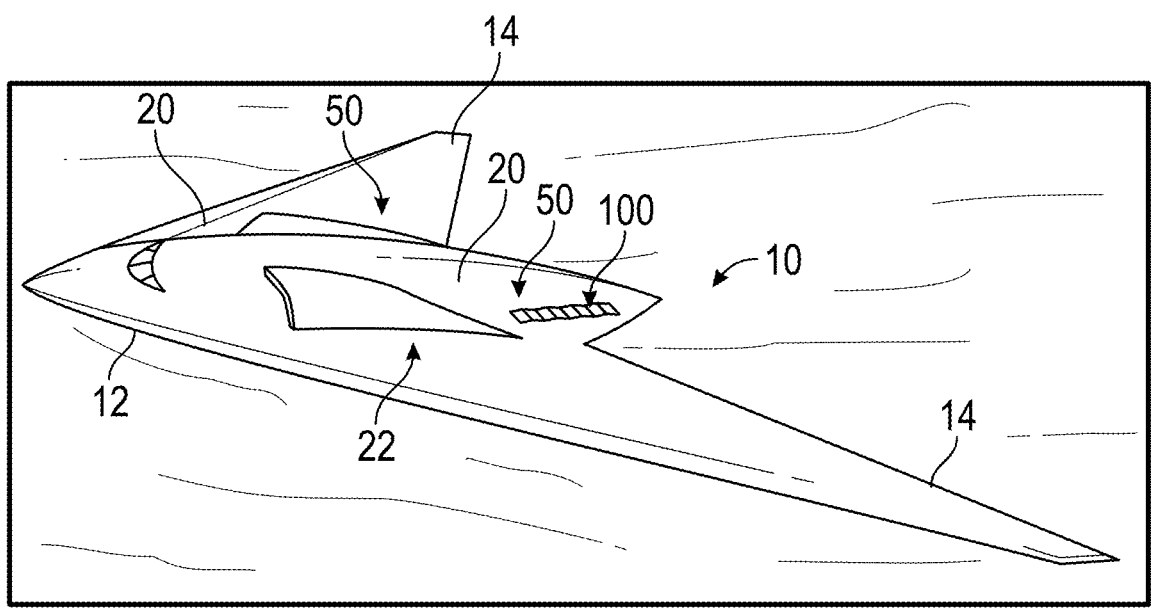

Additionally, in some constructions, as shown in FIG. 1(a), the aircraft 10 further can have a support structure 60 including one or more supports 62 coupling the engines 20 the fuselage 12 (or one or more of the wings 14), and the supports 62 can support the engines 20 at a position or arrangement that is substantially spaced away from the top or upper portion 22 (or lower portion 24). In particular, the supports 62 will be sized, dimensioned or otherwise configured such that the nozzle assemblies 50 are spaced sufficiently away from the suppressing surface 101—e.g., the nozzle assemblies 50 are positioned to have a significant distance between the jet flow 36 released therefrom and the suppressing surface or wall 101 (FIGS. 1 and 2(b)). In one embodiment, the supports 62 will be sized such that an h/D ratio greater than 1, such as about 3 or more, where D is the hydraulic diameter of the nozzle exit 56 and h is the distance from the nozzle assembly 50 or nozzle exit 56 to the suppressing surface or wall 101 [is h the distance from the nozzle assembly or the nozzle exit to the noise suppressing assembly or the]. In additional or alternative constructions, the engines 20 can be mounted directly to or otherwise integrated with the suppressing surface or wall 101, as shown in FIGS. 2(b) and 22(d). That is, the nozzle assembly 50 can be integrated with the suppressing surface or wall 101 to have a relatively small or minimal clearance between the nozzle 50 and suppressing surface or wall 101, and a distance between the nozzle assembly 50 and jet flow 36 therefrom and the suppressing surface being very small in a tight integrated design, with an h/D of less than 1, such as about 0.

Furthermore, in embodiments, the sinusoidal wave of the suppressing surface or wall 101 can be defined by the following function:

$$y_w = A\sin\left[k\left(\frac{x}{D}\right) - \pi\right]$$

where, $k=2\pi/\lambda$ is the wave number, and A is the amplitude that is initially assumed to be D/2. This profile ensures that the waves passing the h=3D line have a $\pi$ phase shift from the impact region x/D=5, so that the waves would linearly cancel each other.

Figure 18A:
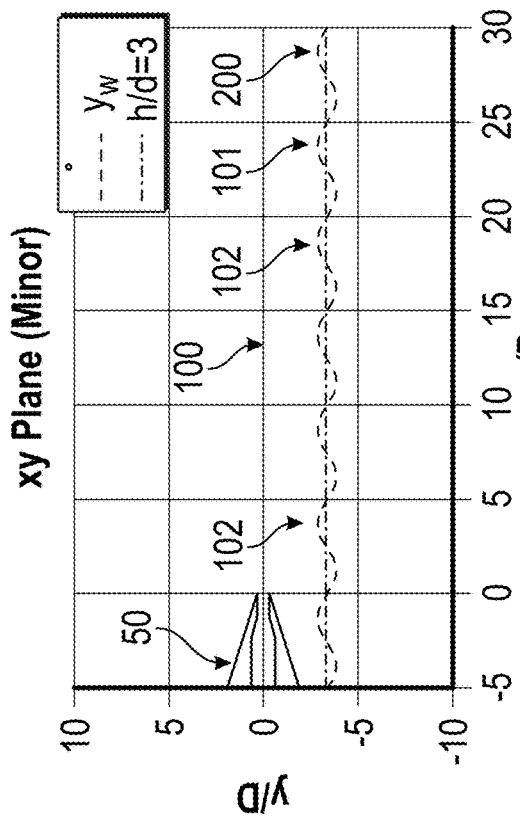
FIGS. 18(a)-(c) illustrate an exemplary wavy wall profile at (h/D=3) for (a) example wavy embodiment 1, (b) example wavy embodiment 2, (c) example wavy embodiment 3.

FIG. 18(a) shows a first embodiment, e.g., wavy embodiment 1, including the following h/D, $\lambda$, and A:

(h/D=3,$\lambda$=5D,A=0.5D)

Figure 18B:
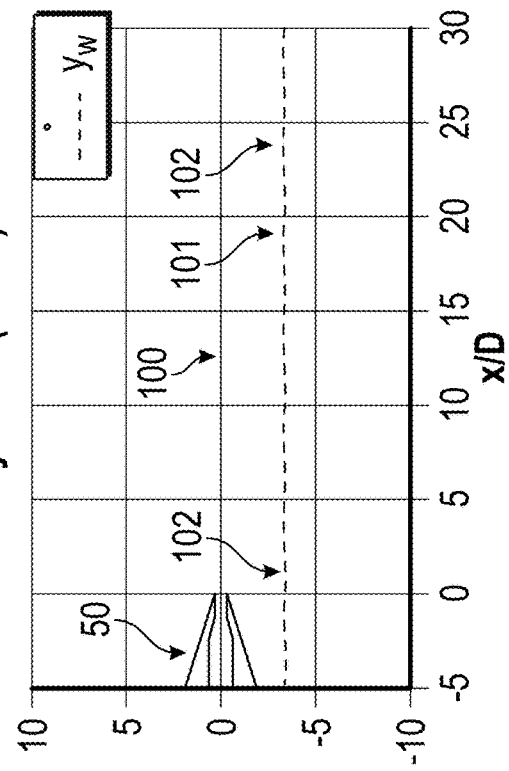

FIG. 18(b) shows a second embodiment, e.g., wavy embodiment 2, including the following h/D, $\lambda$, and A:

(h/D=3,$\lambda$=5D,A=0.05D)

Figure 18C:
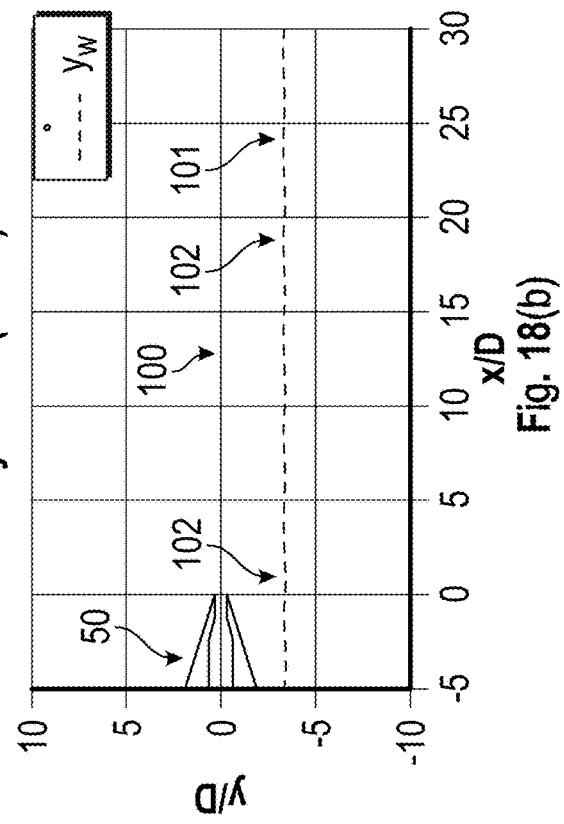
Figure 19A:
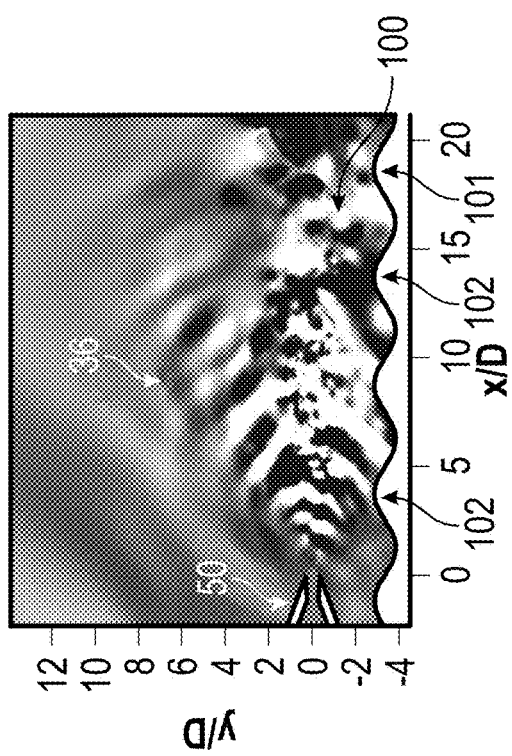
FIGS. 19(a)-(d) show instantaneous pressure fluctuation for (a) an example flat plate, (b) example wavy embodiment 1, (c) example wavy embodiment 2, and (d) example wavy embodiment 3.
Figure 19B:
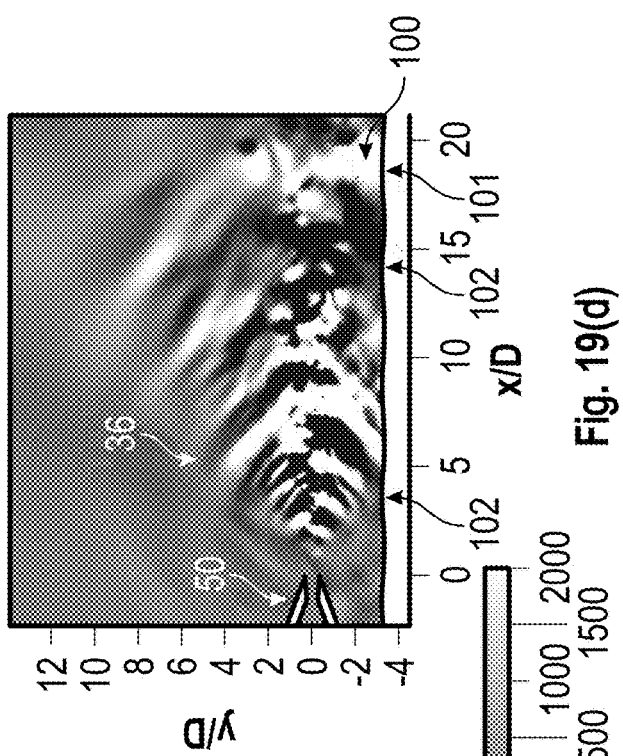
Figure 19C:
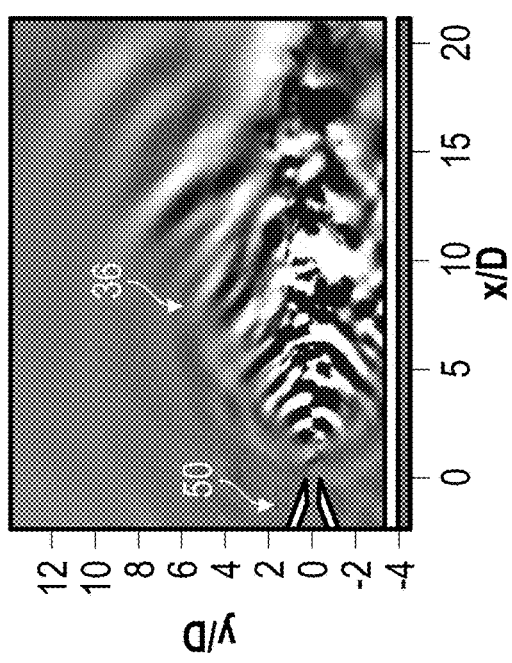
Figure 19D:
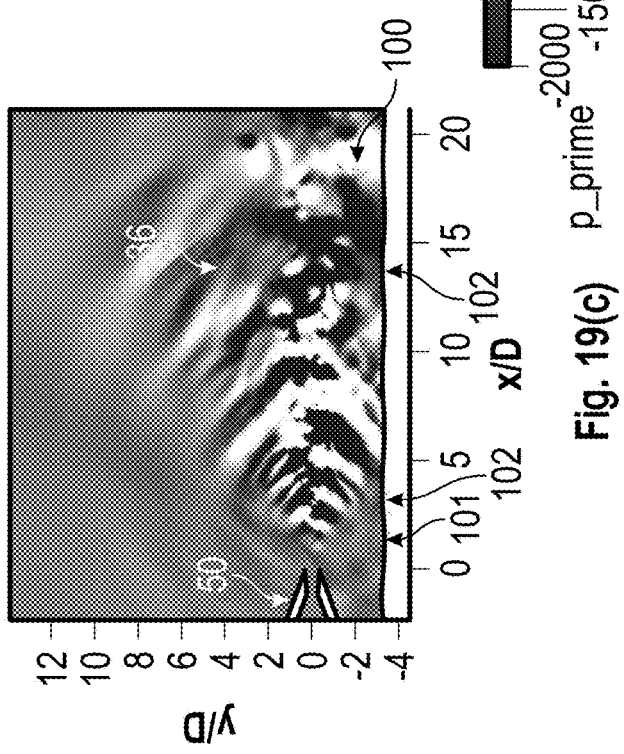

FIG. 18(c) shows a third embodiment, e.g., wavy embodiment 3, including the following h/D, $\lambda$, and A:

(h/D=3,$\lambda$=2.5D,A=0.05D)

Numerical Analysis

To evaluate the effectiveness of the wavy design vs. a flat design, high-fidelity Detached Eddy Simulations (DES) were conducted to calculate the flow field and the radiated noise of a supersonic jet in both cases of using either a flat surface 200, flat plate, or flat shield or a wavy surface (e.g., suppressing surface or wall 101). Considered here is a supersonic, ideally expanded heated jet exhausting from a 2:1 aspect ratio nozzle. The flat surface study enables further understanding of the mechanisms involved. In particular, the wavy wall shielding surface (e.g., suppressing surface or wall 101) can introduce periodic disturbances to suppress the noise-generating large-scale structure, for example the introduction of subharmonics or harmonic can reduce the noise-efficient fundamental wave in the jet flow. Such a wavy wall profile may have selected several parameters such as: amplitude, wavelength, and phase shift.

A numerical approach is now presented. This is followed by validation against experimental data for a free jet and the effect of a flat surface 200. Then, an explanation on the mechanisms governing the effect of the shield on the radiated noise is provided. Two configurations were considered that match the aircraft design configuration. One in which the shield is right at the nozzle exit 56 thus allowing strong flow-surface interaction, the other is when the shield is a distance h/D=3 apart allowing strong acoustic reflection effect.

To show the benefits of the wavy shield (e.g., suppressing surface or wall 101) it is compared with the base case of using the flat surface 200. The convergent-divergent (C-D) rectangular nozzle (12.95 mm×25.91 mm) of a supersonic jet is considered, for which the acoustic field data for various distanced h/D values have been reported. The equivalent diameter of the nozzle exit is D=20.65 mm. FIG. 2(*a*) shows the 2:1 aspect ratio rectangular nozzle with a C-D profile. The nozzle's area ratio is 1.18 with a design Mach number of 1.5, which corresponds to a nozzle pressure ratio (NPR) of 3.67. The nozzle temperature ratio (TR) is chosen here is such that it resembles the experimental set-up (TR=$T_0$/$T_a$=3.0), where $T_0$ is the total temperature of the jet and $T_a$ is ambient temperature. The nozzle is sharply C-D in the cross-sectional minor axis plane, as illustrated in FIG. 2(*a*).

The base case of a supersonic jet issuing over a flat surface 200 was simulated. The thickness is about 12.7 mm and the flat surface 200 is placed parallel the jet axis and aligned with the nozzle 50's major axis, and it extends up to x/D=30 downstream of the jet axis and z/D=10.5 in the Major axis. This is similar to the configuration illustrated in FIG. 2(*b*), except with the wavy surface (e.g., suppressing surface or wall 101) replaced with a flat surface 200. For the simulations carried out here the flat surface 200 is located such that the top surface of the plate is h/D=3 away from the nozzle exit. The height of the wavy pattern and/or portions thereof further can be adjusted and/or selected for a desired noise mitigation effect.

In addition to the flat surface 200 cases investigated by experimental measurements, wavy wall profiles (e.g., suppressing surface or wall 101 profile) of the noise suppression assembly 100 also are considered and shown to introduce disturbances in the flow and acoustic field to facilitate enhanced noise reduction. The wavy wall profile (e.g., suppressing surface or wall 101 profile) can include several selectable parameters such as: distance of the mean line from nozzle lip (h/D), wavelength (A), and amplitude ($A_{wall}$). These parameters will be discussed in detail in the wavy wall section later.

Moreover, the computational grid that was used in these simulations contained hexahedrally dominant cells. The entire computational domain extends to 80D downstream of the nozzle exit and 10D upstream of the nozzle exit, also it extends radially up to 25D from both the major and minor axis planes. The grid spacing on nozzle walls was chosen such that it ensures $y^+$ to have a value of 30 on the wall, and to make sure the close wall calculations of boundary layer in the RANS region are accurate. This value for $y^+$ is calculated considering the isentropic flow assumption along the nozzle and using the nozzle exhaust velocity $U_j$.

As it is illustrated in FIGS. 3(*a*) and 3(*b*), the fine grid spacing on nozzle walls are gradually increased such that the volume inside the nozzle has the maximum element sizing of D/50. Such grid spacing is kept consistent for both baseline and with-plate (shielded) cases. FIG. 3(*b*) illustrates the grid spacing in major plane that has the same $y^+$ and expands to same maximum grid spacing as mentioned earlier. This grid spacing is maintained and extended up to x/D=5 in the jet axis direction to capture turbulent mixing near nozzle exit, and then it is gradually increased up to D/40 in jet axis direction up to x/D=20. These refinement regions are illustrated by the boxes including D/50, D/40, and D/30 in FIGS. 4(*a*)-(*b*) and by the boxes including D/40 and D/30 in FIGS. 4(*a*)-(*b*). Then, another refinement box was placed that is extended to x/D=30 (and maintained up to x/D=40), which gradually increases the cell size up to maximum value of D/30, shown in a similar fashion with blue box in FIGS. 4(*a*)-(*b*).

The grid spacing expands gradually in both major and minor directions up to y/D=6, and z/D=10 and reaching the grid spacing of D/10. This conservative coarsening in axial direction up to x/D=40 and in major and minor directions was chosen to have a refined box to predict acoustics. The (Ffowcs-Williams Hawkins (FWH) surface used included a rectangular box from the nozzle exit extending to y/D=6, and z/D=10 in major and minor planes, and up to x/D=30 in the jet axis direction. This near field region is illustrated with the red box in FIGS. 4(*a*)-(*b*). The refined nearfield acoustic region has maximum grid spacing of D/10 and is to be used for FWH acoustic predictions. Sensitivity studies of the extent of the FWH up to x/D=40 is investigated previously and reported by Salehian and Mankbadi [1]. Such grid spacing on FWH surface would ensure capturing acoustic waves up to Strouhal number St=fD/$U_j$=0.35 where f is the frequency. This maximum frequency represents up to 70% of the spectra shown in experimental results and contains the most of the trend in spectral analysis of the acoustic signal, such as the peak frequency of St=0.1 observed in experimental results. From the numerical point of view, the maximum resolvable frequency is calculated based on the assumption that a minimum of 15 points (cells) per wavelength are required to capture the acoustic waves up to St=0.35 with the current numerical scheme. Such requirement has been tested for prediction of waves using second-order finite volume schemes when applied to hexahedral cells.

Figure 6:
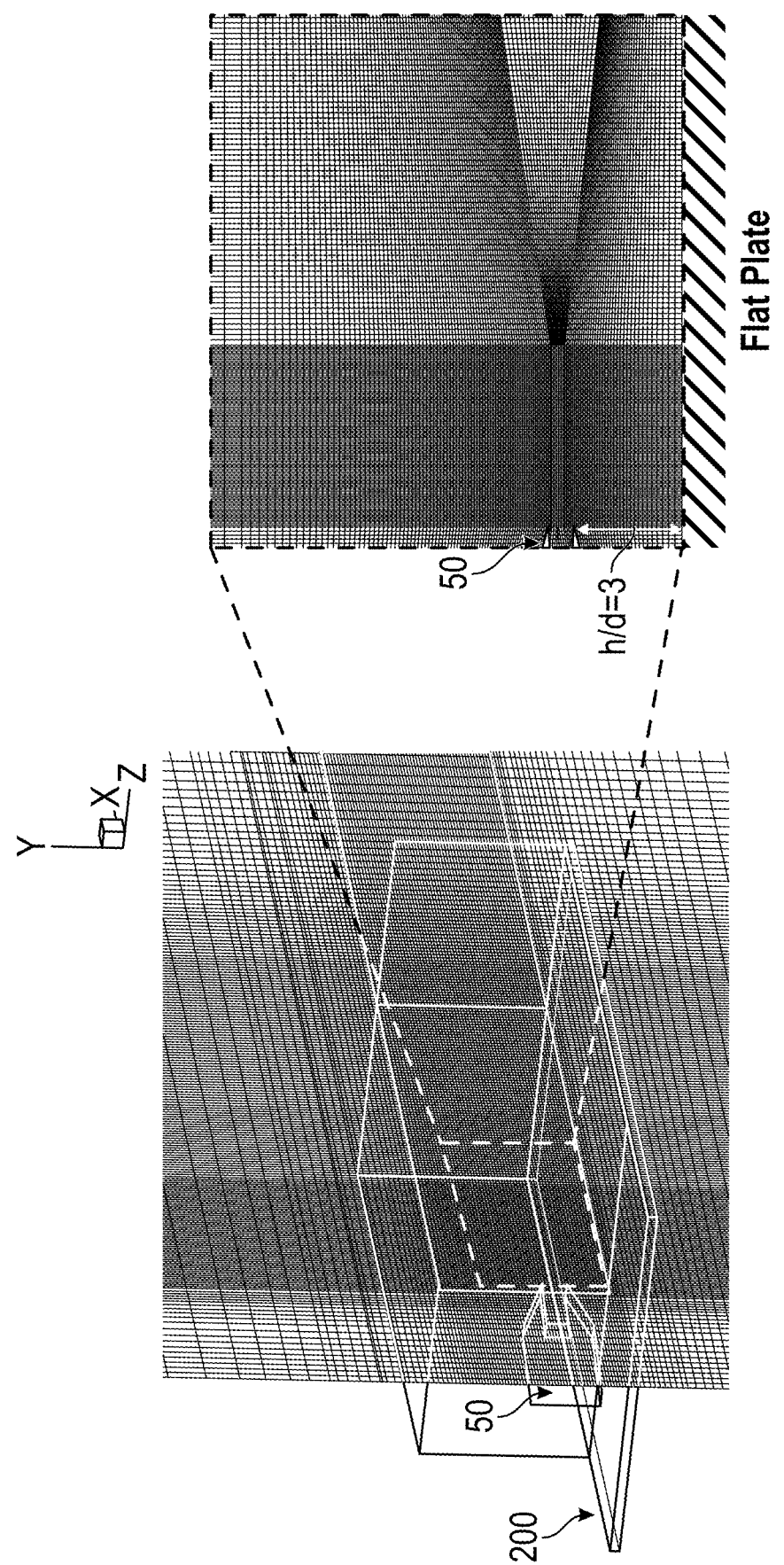
FIG. 6 shows a computational domain of the shielded case (h/D=3).

The shielded cases can have the same grid spacing as the baseline case inside the nozzle, as well as in the refinement boxes mentioned above in FIGS. 4(*a*)-(*b*). The only difference is in the dimensions of the near field acoustic box, while maintaining the same grid spacing of D/10. The near field region expands gradually in minor directions up to z/D=10 like the baseline case and up to y/D=6 in the reflected side, but it is bounded by the flat plate at location of the flat plate (y/D=−3). The near field acoustic region is illustrated in FIGS. 5(*a*)-(*b*) both in x-z plane (y=0), for the both cases of the flat plate at h/D=3 (FIG. 5(*a*)), and h/D=0 (FIG. 5(*b*)). For the wall jet case, h/D=0, the grid spacing on the flat plate wall was chosen such that it ensures $y^+$ to have a value of 30. However, no extensive grid spacing is maintained on the flat plate, when located at h/D=3, since the jet does not hit the flat plate unless in much further distance from the nozzle exit (x/D>25), and there is no need for boundary later grid enforcement for this case. Moreover, since one of the major objectives here is to capture the reflection of the acoustic waves from the solid boundary, and since the flat plate is at a considerable distance from the jet, boundary layer prediction on the flat plate is not considered. FIG. 6 illustrates the grid spacing in the nearfield acoustic region, as well as near the flat plate. The wavy wall cases of the noise suppression assembly 100 have the exact same grid spacing as mentioned for shielded cases (h/D=0, 3).

The numerical solver and procedure are summarized below. The rhoCentralFoam solver in OpenFOAM can be adopted. rhoCentralFoam is an unsteady, compressible solver, that uses semi-discrete, non-staggered, Godunov-type central and upwind-central schemes. These schemes can avoid the explicit need for a Riemann solver, resulting in a numerical approach that is both simple and efficient. The solver is a density based central scheme solver and solves the compressible Favre-averaged mass, momentum, and energy governing equations in the Eulerian frame of reference. The continuity, momentum, and energy equations are solved in their conservative form as:

$$\frac{\partial \rho}{\partial t} + \nabla \cdot [\rho u] = 0 \quad (1)$$

$$\frac{\partial (\rho u)}{\partial t} + \nabla \cdot [u(\rho u)] + \nabla p + \nabla \cdot T = 0 \quad (2)$$

$$\frac{\partial (\rho E)}{\partial t} + \nabla \cdot [u(\rho E)] + \nabla \cdot [up] + \nabla \cdot (T \cdot u) + \nabla \cdot j = 0 \quad (3)$$

where $\rho$ is the density, u is the fluid velocity, p is the pressure, and $E=e+|u|^2/2$ is the total energy per unit mass with e being the specific internal energy. Here, T is the viscous stress tensor and is represented by Newton's Law for a non-inviscid flow as: $T=-2\mu\text{dev}(D)$. Here, $\mu$ is the dynamic viscosity, D is the deformation gradient tensor $D=[\nabla u+(\nabla u)^T]/2$ and its deviatoric component is $\text{dev}(D)=D-(1/3)\text{tr}(D)I$, where I is a unit vector. Also, j is the diffusive heat flux that is represented by Fourier's law as $j=-k\nabla T$, where T is temperature and k is the conductivity.

In addition to the above equations, the system of equations is completed with the assumption of calorically perfect gas for which $p=\rho RT$ and $e=c_v T=(\gamma-1)RT$, where R is the specific gas constant and $\gamma=c_p/c_v$ is the ratio of specific heats at constant pressure and volume, respectively.

A Finite Volume method is applied for expressing the differential equations. In the application of the finite volume to polyhedral cells with an arbitrary number of faces, each face can be assigned to an owner cell and a neighboring cell. The directed convective fluxes mentioned above, can be interpolated using a vanAlbada scheme to provide a second order spatial discretization that, as a TVD scheme, is appropriate for capturing flow discontinuities such as shocks, and the limiter automatically provides high order stable solution. In addition, second order implicit temporal discretization can be used to ensure overall second order accuracy of the numerical simulations.

In one variation, the k–ω SST DES turbulence model can be adopted, where the URANS models are employed only in the boundary layer, while the LES treatment is applied everywhere else. Therefore, the computational cost is much efficient compared to the full LES that requires extensive near wall treatment. For the current simulations, a statistically steady solution was achieved with the k–ω SST RANS model first, then the DES simulations are carried out using the RANS results as an initial solution.

The URANS k–ω SST turbulence model relies on solving two transport equations for the turbulence kinetic energy, k, and turbulence specific dissipation rate, ω. The DES formulation of the k–ω SST model can be achieved such that in the LES regions of the grid, the solution would reduce to a Smagorinski-like sub-grid model, such that the eddy viscosity is proportional to the magnitude of the strain tensor, and to the square of the grid spacing. Therefore, the only term of the RANS model that may be different in the DES mode is the dissipative term of the k transport equation.

Far field acoustics can be obtained using the Ffowcs Williams-Hawkings surfaces integral technique. The FW-H equation is an inhomogeneous wave equation derived by manipulating the continuity equation and the Navier-Stokes equations. It can be assumed that the control surface contains all acoustic sources, and the volume integrals outside this surface can be dropped. The Farassat 1A formulation of the FW-H equations can be utilized such that the far field acoustic, is represented as:

$$p'(x,t) = p'_T(x,t) + p'_L(x,t) + p'_Q(x,t) \quad (4)$$

Details of the implementation of the formulations in OpenFOAM using the dynamic libraries may be understood by those of skill in the art. For a non-moving control surface, the surface integral equations are simplified to:

$$4\pi p'_T(x,t) = \int_{f=0} \left[\frac{\rho_o(\dot{U}_n)}{r}\right]_{ret} dS \quad (5)$$

$$4\pi p'_L(x,t) = \frac{1}{c}\int_{f=0}\left[\frac{\dot{L}_r}{r}\right]_{ret} dS + \int_{f=0}\left[\frac{L_r}{r^2}\right]_{ret} dS \quad (6)$$

$$U_i = (\rho/\rho_o)u_i \quad (7)$$

$$L_i = P_{ij}\hat{n}_j + \rho u_i u_n \quad (8)$$

where, all the terms can simplify to, $$U_n = U_i \hat{n}_i, \; \dot{U}_n = \frac{\partial U_n}{\partial t}, \; L_r = L_i \hat{r}_i, \text{ and, } \dot{L}_r = \frac{\partial L_r}{\partial t}.$$

Here, r is the distance between source and observer. $\dot{L}_r$, and $\dot{U}_n$ represent the source time derivatives. The subscripts r or n denote a dot product of the vector with the unit vector in the radiation direction $\hat{r}$, or the unit vector in the surface normal direction $\hat{n}$ respectively. The term "ret" refers to retarded time. The term, f=0, represents closed surface integration on the control surface. The last term in equation (4), $p'_Q$, is the volume integral which represent quadrupole (volume) sources in the region. The contribution of the volume integrals becomes very small when the source surface encloses the source region. Hence this term is ignored in the computations presented here, since the FWH is at a considerable distance from the sources.

At the nozzle inlet, a total pressure condition of 3.67 MPa is specified and the jet was expected to be ideally expanded with a NPR value of 3.67. Temperature at the inlet of the nozzle is prescribed to 900K to ensure the TR=3.0. where ambient pressure is $P_a=101325$ Pa, and has a temperature value of $T_a=300K$. Advective far-field condition was imposed on the rest of the domain boundaries, which corresponds to "waveTransmisive" boundary conditions in OpenFOAM. This non-reflecting condition is based on the same idea of non-reflecting boundary condition as mentioned by Poinsot and Lele [32] without full inter-field coupling.

The nozzle inner walls are prescribed as adiabatic no-slip condition, so the RANS simulations near the wall can predict the boundary layer with the specified $y^+$. On the other hand, on the flat plate adiabatic slip conditions can be imposed. Since the flat plate is only to reflect the acoustic wave, the no-penetration rule is enforced by imposing $\partial p/\partial n=0$ for pressure, and zero normal velocity $u \cdot \hat{n}=0$.

Figure 7A:
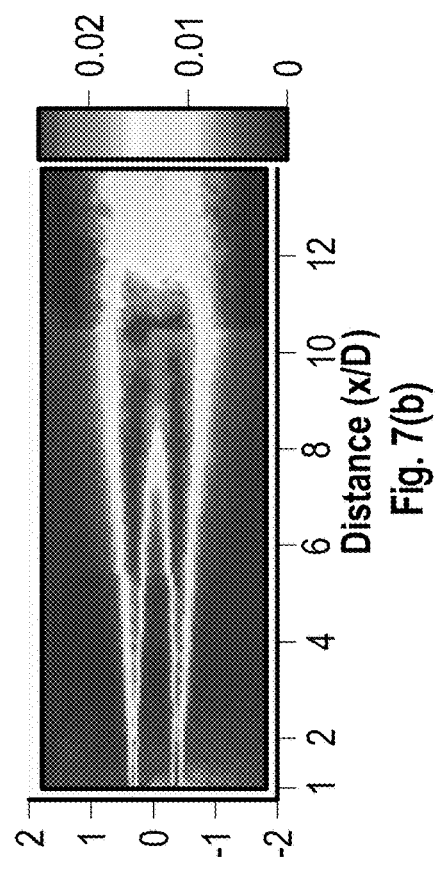
FIG. 7(a) and FIG. 7(b) show TKE normalized by jet velocity squared, (a) Isolated Jet case Numerical (NPR=3.67, TR=3.0), (b) Experiment (NPR=3.67, TR=2.0).
Figure 7B:
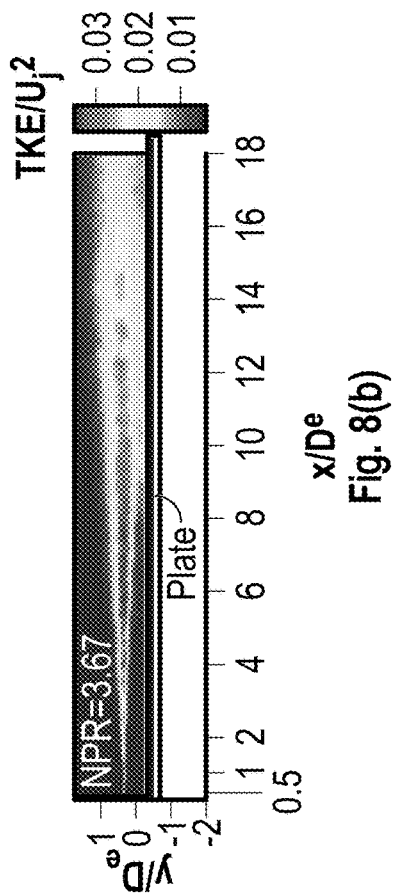
Figure 8A:
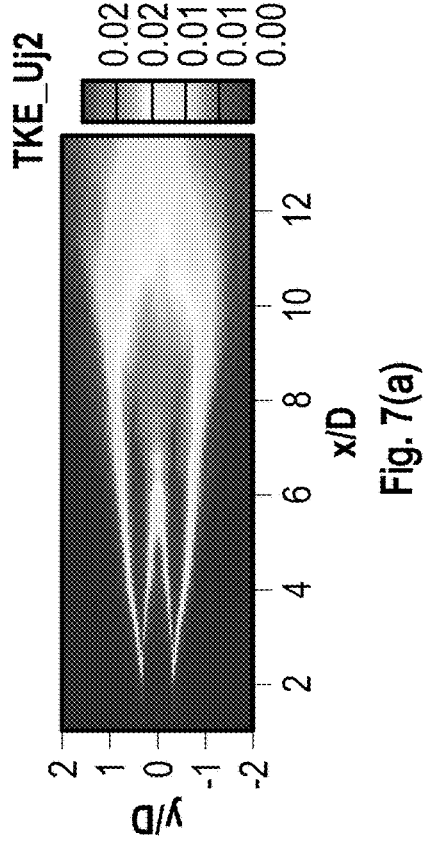
FIG. 8(a) and FIG. 8(b) show TKE normalized by jet velocity squared, (h/D=0) case (a) Numerical (NPR=3.67, TR=3.0), (b) Experiment (NPR=3.67, TR=2.0).
Figure 8B:
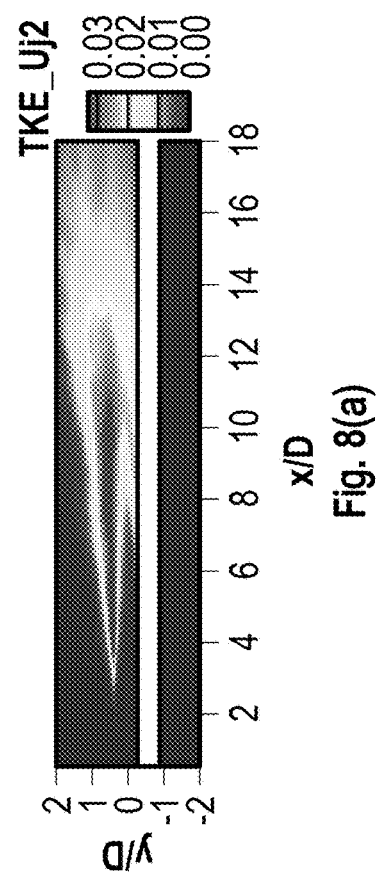

For validation purposes and comparison with experimental measurements, the isolate jet (no shielding plate) and the wall jet flow case (flat plate at h/D=0) also are presented. The Turbulent Kinetic Energy (TKE) is illustrated in FIGS. 7(a), 7(b), and 8(a)-(b). TKE here is normalized with respect to the jet velocity squared ($TKE/U_j^2$). The baseline case is compared with the experimental results for the ideally expanded heated jet (NPR=3.67, TR=2.0), as illustrated in FIG. 7(b). Also, the shielded case shown in FIGS. 8(a) and 8(b), can be compared with experimental results for an ideally expanded heated jet (e.g., TR=2.0, and TR=2.4). These experimental results can be chosen for validation, since these results have the closest operating conditions to the current numerical simulations among all experimental results available in the literature for this nozzle geometry, at this time. The numerical results exhibit the same structure of turbulence, especially in the near-wall region, as shown in FIGS. 8(a) and 8(b). Furthermore, the location of the separation of the boundary layer on the flat plate can be observed in FIG. 8(a), which is located at x=6D and agrees with the experiment (FIG. 8(b)). The jet is held by the flat plate from one side, which prevents the dissipation of the jet from that side and causes the asymmetric structure of the kinetic energy dissipation.

To investigate the effect of the flat plate 200 on radiated noise in far field, acoustic spectra are presented at two main microphone probes located at 152° prescribed as points A an A'. More specifically, the two probe angles are measured from the upstream of the jet axis, but on the shielded side. The acoustic results are calculated and compared with experimental data. The location of the probes, the reflected side, and the shielded side are illustrated in the schematics shown in FIG. 9.

For the exemplary spectral data presented here, 4 sequences of 1024 samples were collected at a sampling frequency of 204.8 kHz. Fast Fourier transform can be applied to obtain the narrowband noise spectrum. The frequency can be a non-dimensionalized to obtain Sound Pressure Level (SPL) (dB rel 20 µPa), as a function of Strouhal number, as explained in the earlier sections.

Figure 10A:
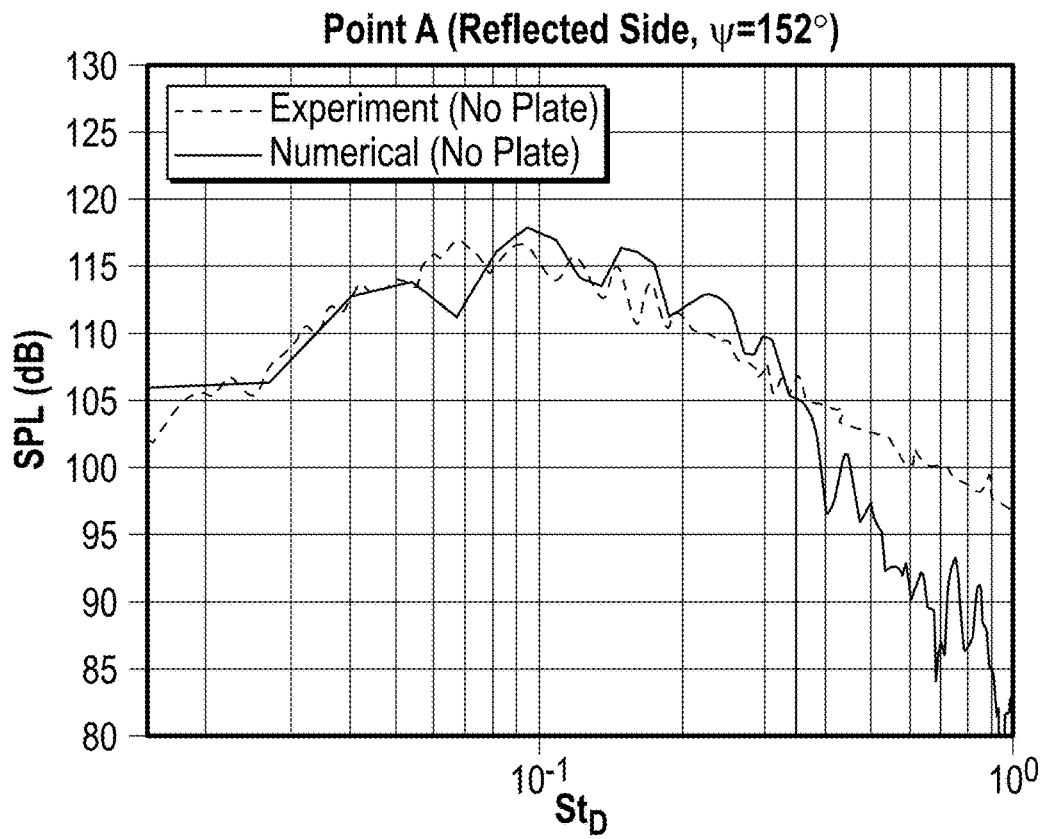
FIG. 10(a) and FIG. 10(b) show acoustic spectra at =152° (a) reflected (A), and (b) shielded side (A'), with no plate.
Figure 10B:
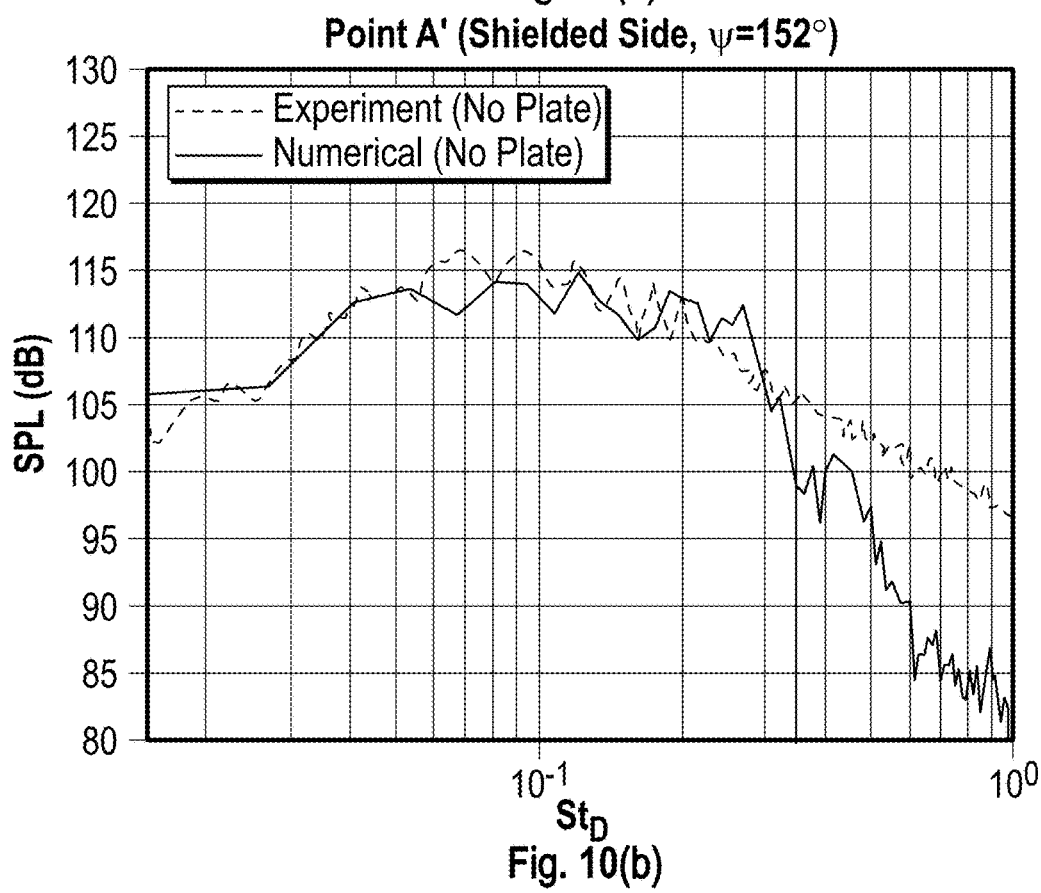
Figure 11A:
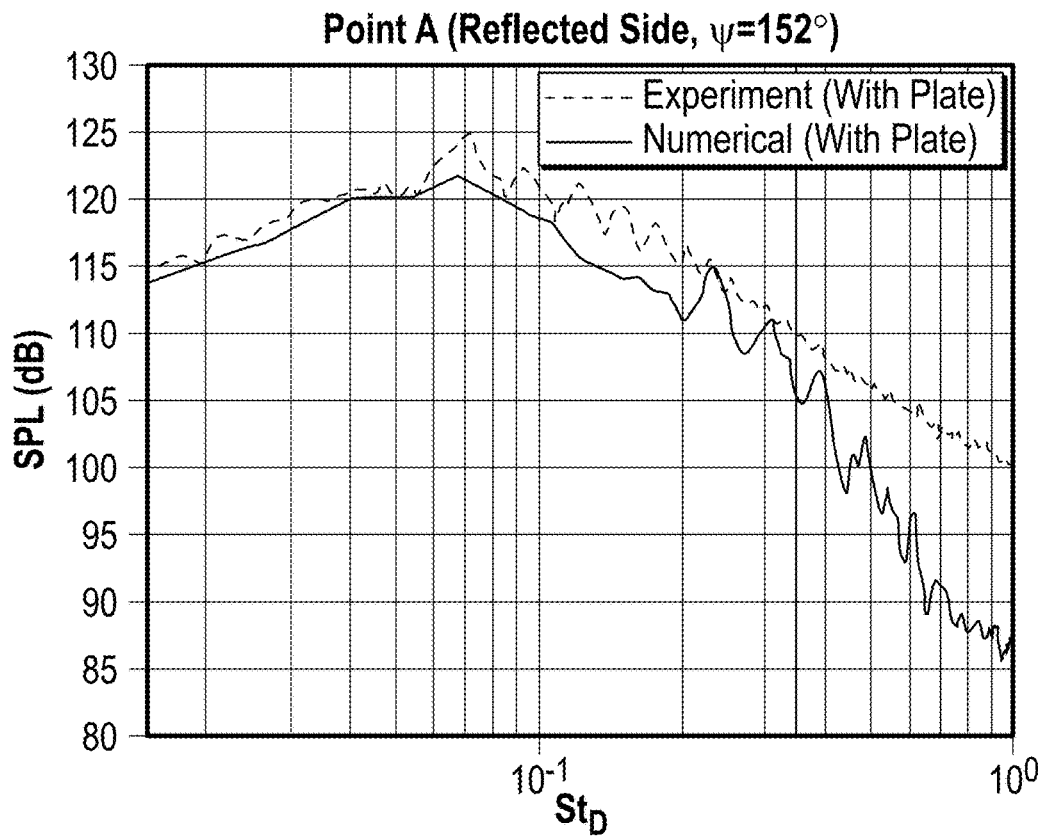
FIG. 11(a) and FIG. 11(b) show acoustic spectra at =152° (a) reflected (A), and (b) shielded side (A'), with a flat plate having h/D=0.
Figure 11B:
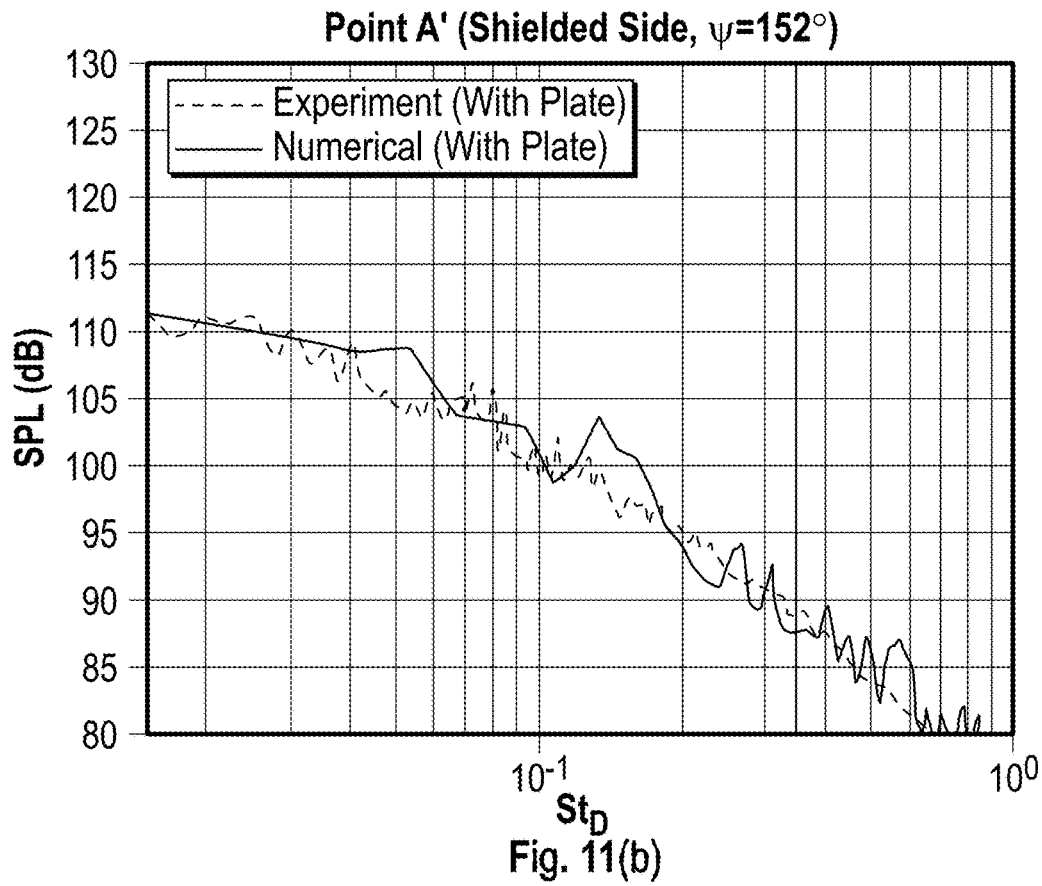

FIGS. 10(a) and 10(b) shows a comparison of SPL spectra between the reflected side and the shielded side (point A and A', ψ=152°) for the free jet case, and FIGS. 11(a) and 11(b) show the spectra for the same locations for the flat place bounded case h/D=0.

Comparing the SPL spectra in FIGS. 10(a) and 11(a), the shielded configuration increases noise levels across all frequencies, especially at the lower frequencies about 10 dB between more than the free jet. This low-frequency noise component may be associated with the noise intensification generated by the jet-trailing edge interaction and the scrubbing noise.

As expected, drastic reduction in noise levels is observed for all plate configurations relative to the free jet. The observed reduction of noise levels is caused by the shielding effect of the plate on the noise sources from the jet plume. Such drastic reduction in the SPL is due to the dimension of the flat plate used in the numerical simulations and the experiment, and the noise reduction in the shielded direction is highly influenced by the dimensions of shielding surface.

Figures 12A, 12B:
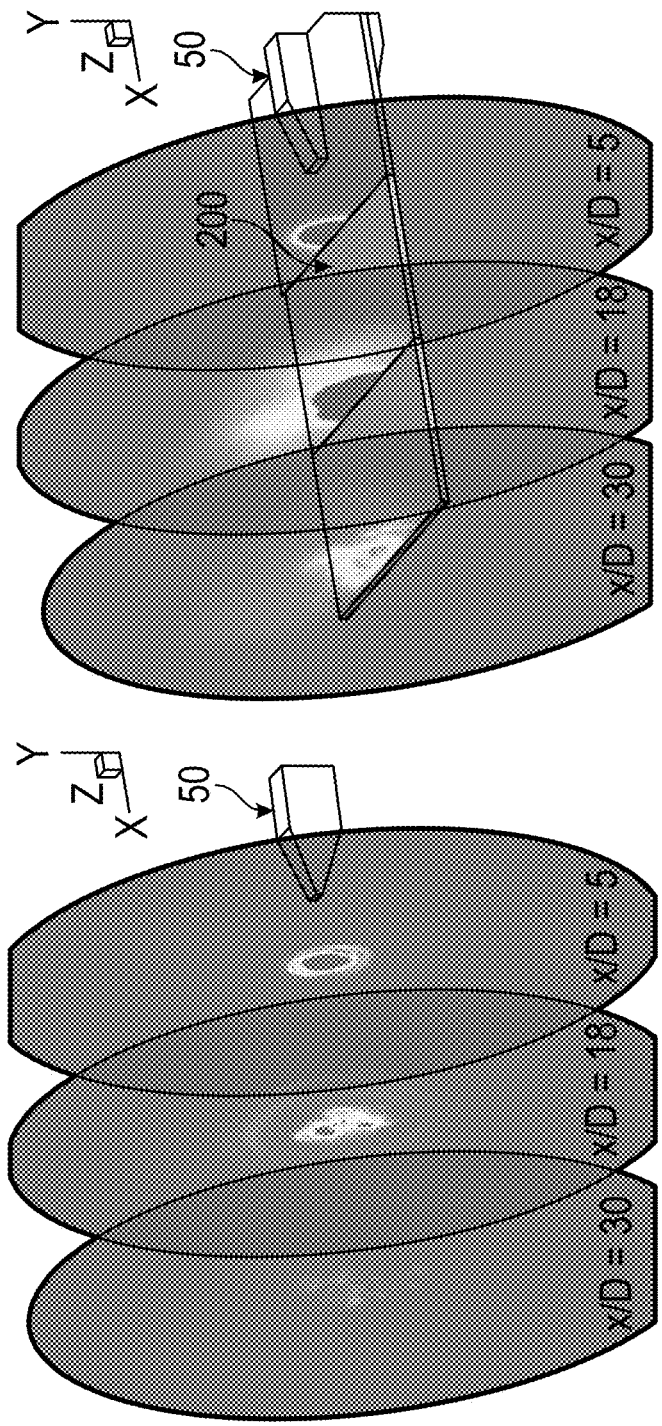
FIG. 12(a) and FIG. 12(b) show evolution of the fluctuating pressure R.M.S along jet axis including (a) no plate, (b) with plate $$\frac{h}{D} = 0.$$

As illustrated in the TKE figures, the potential core of the jet is affected by the flat plate 200, reducing the turbulence in the near nozzle region of the flat plate. Moreover, the separation of the boundary layer from the flat plate induces fluctuations in the further downstream of the flat plat and gives rise to generation of a dipole-like source at the trailing edge of the flat plate 200. The acoustic results are presented for validation purposes, as well as, showing the shielding effect. The recent theoretical work employs rapid distortion theory and exhibits the asymmetry of the shear layer when it exhausts over a flat plate. To elaborate the mechanism that causes an increase of SPL in the shielded direction due to the flat plate, the root mean square (RMS) of the fluctuation component of the pressure (p'=p−p̄) is illustrated at axial cutting plane locations of x/D=5, 18, and 30 in FIGS. 12(a) and 12(b). Comparing the evolution of pressure fluctuations along the jet axis for the free jet, as illustrated in FIG. 12(a), and with the shielded case, as illustrated in FIG. 12(b), it can be observed that the flat plate maintains the energy of the jet much further from the jet exit. This was also shown earlier in TKE contours (FIGS. 8(a)-(b) and 9). The bounded nature of the shielding wall avoids the dissipation of the turbulence fluctuations in regions closer to the jet exit. The energized flow leaving the flat plate 200 behaves as the vortex leaving the trailing edge of the flat plate. The trailing edge vortex has a dipole-like structure that acts as an additional source of noise that increases the SPL in the shielded direction.

Following up on the baseline and wall jet cases mentioned earlier, the distance of the flat plate from the jet axis can have an effect on the flow field and acoustics of the jet and compare with the baseline and wall jet (h/D=0).

Figure 13A:
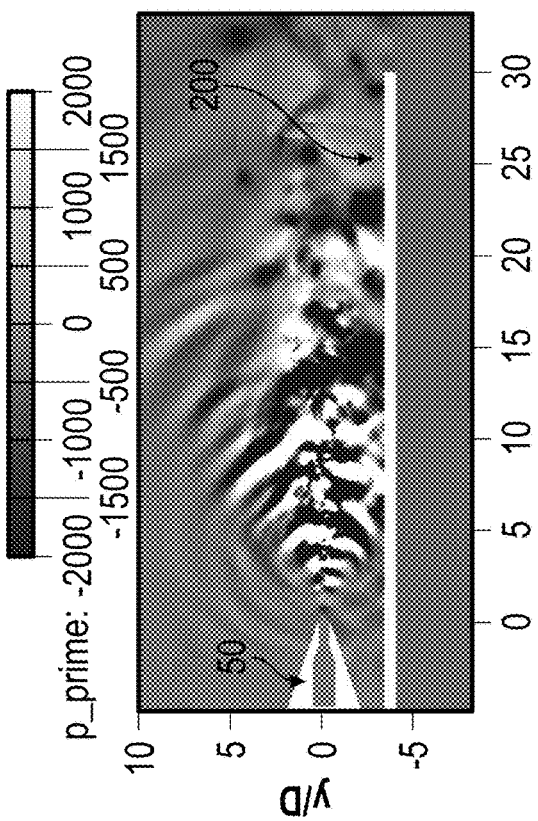
FIG. 13(a) and FIG. 13(b) show instantaneous low field and acoustics of the (h/D=3) case. (a) Mach (M), (v) Fluctuating pressure (p').
Figure 13B:
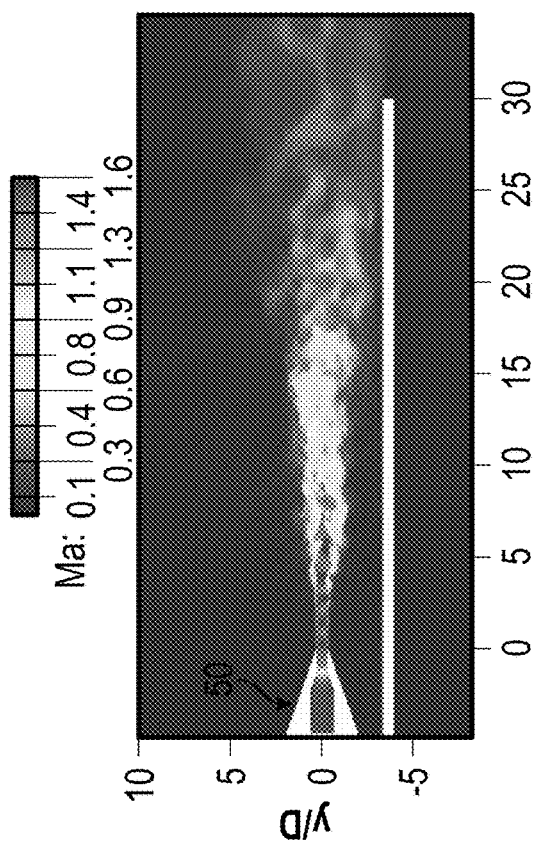

FIG. 13(a) illustrates the Mach number contour for the case where plate is placed at (h/D=3). Unlike the wall jet flow case (h/D=0), the bulk of flow field is not bounded by the plate, and the jet spreads out and the jet flow barely starts sweeping on the plate after x/D=30. The fluctuating component of pressure, shown in FIG. 13(b) and denoted by p', exhibits the acoustic waves reflecting from the flat plate. The dominant downstream travelling waves hit the plate at around x/D=5 on the flat plate and reflect into the jet flow.

Figure 14A:
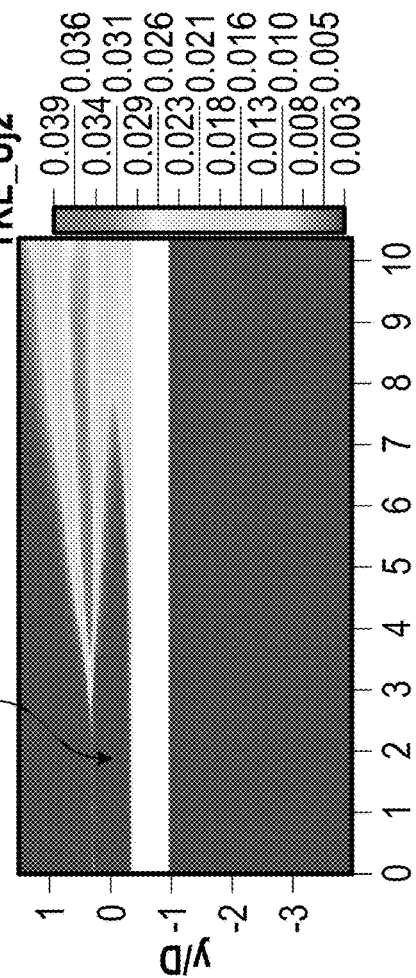
FIG. 14(a) and FIG. 14(b) show turbulent Kinetic Energy normalized by jet velocity squared. (a) (h/D=3) case, (b) (h/D=0) case.
Figure 14B:
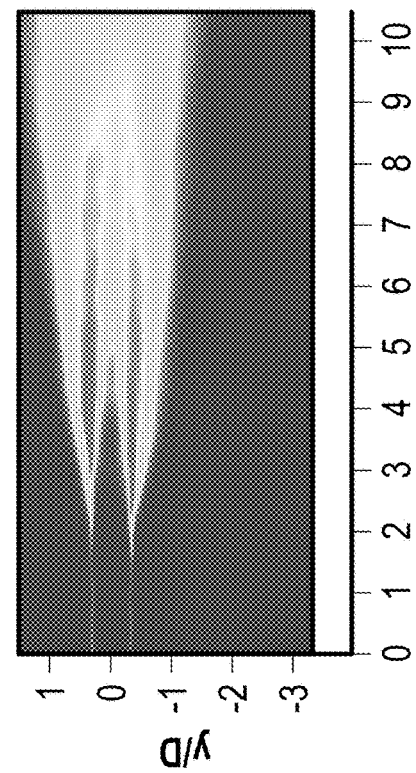

These reflections can have an impact on the turbulence structure of the jet. The effect of the location of flat plate on TKE is shown in FIGS. 14(a) and 14(b). Since the jet is not bounded by the flat plate in the (h/D=3) case, the drastic shear layer extension does not occur as discussed earlier for the (h/D=0) case. However, the reflections from the plate interact with the jet plume and energize the shear layer on the plate side. Hence, causing the asymmetry in the TKE structure for the (h/D=3) case when compared to the isolated jet seen in FIG. 7(a). The normalized TKE on the shear layer side is plotted for both cases of (h/D=0) and (h/D=3) and compared with the experimental data.

Figure 15A:
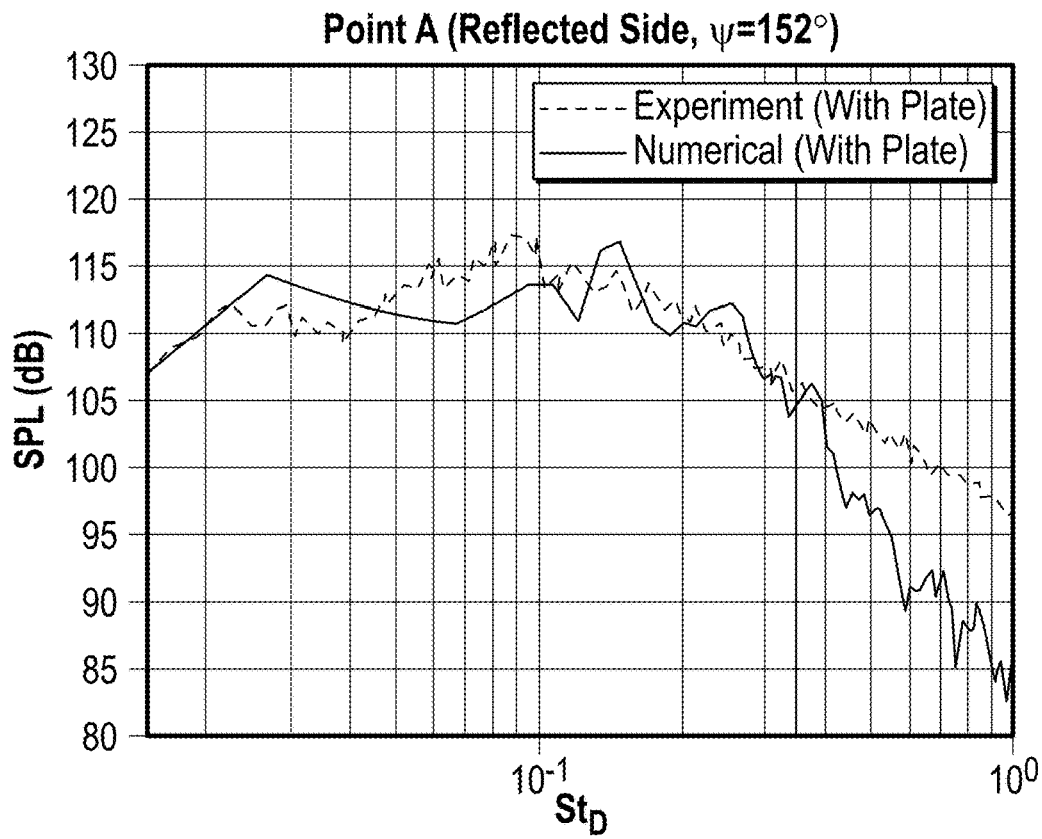
FIG. 15(a) and FIG. 15(b) show acoustic spectra at ψ=152° (a) reflected (A), and (b) shielded side (A'), with a flat plate having a h/D=3.
Figure 15B:
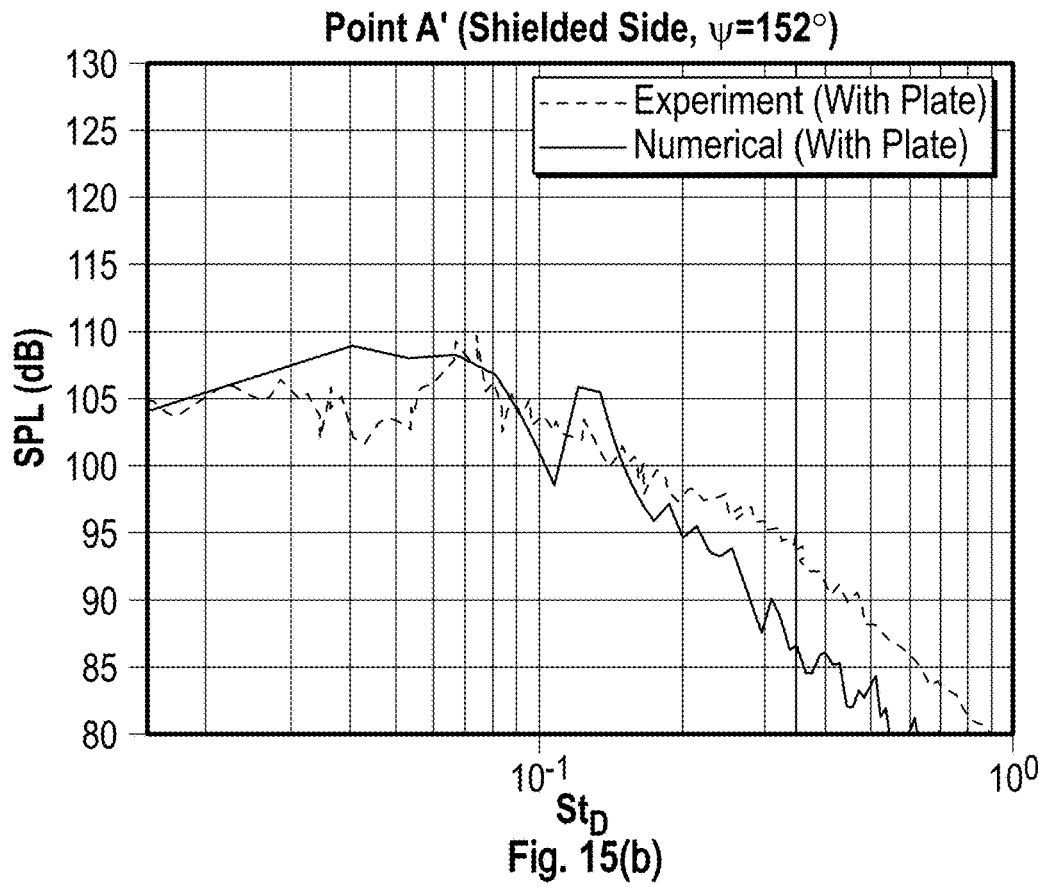

FIGS. 15(a) and 15(b) compare SPL spectra between the reflected side, as illustrated in FIG. 15(a), and the shielded side, as illustrated in FIG. 15(b), (point A and A', ψ=152°) for the (h/D=3) case. As seen earlier, the acoustic spectra results show favorable agreement with the corresponding experimental data, both in terms of the predicted level of acoustics, as well as the trend of spectra. The acoustic shielding effect is visible here, like the (h/D=3) case. However, the increase in noise levels on the reflection side, is not as drastic as the (h/D=0) case.

Figure 16A:
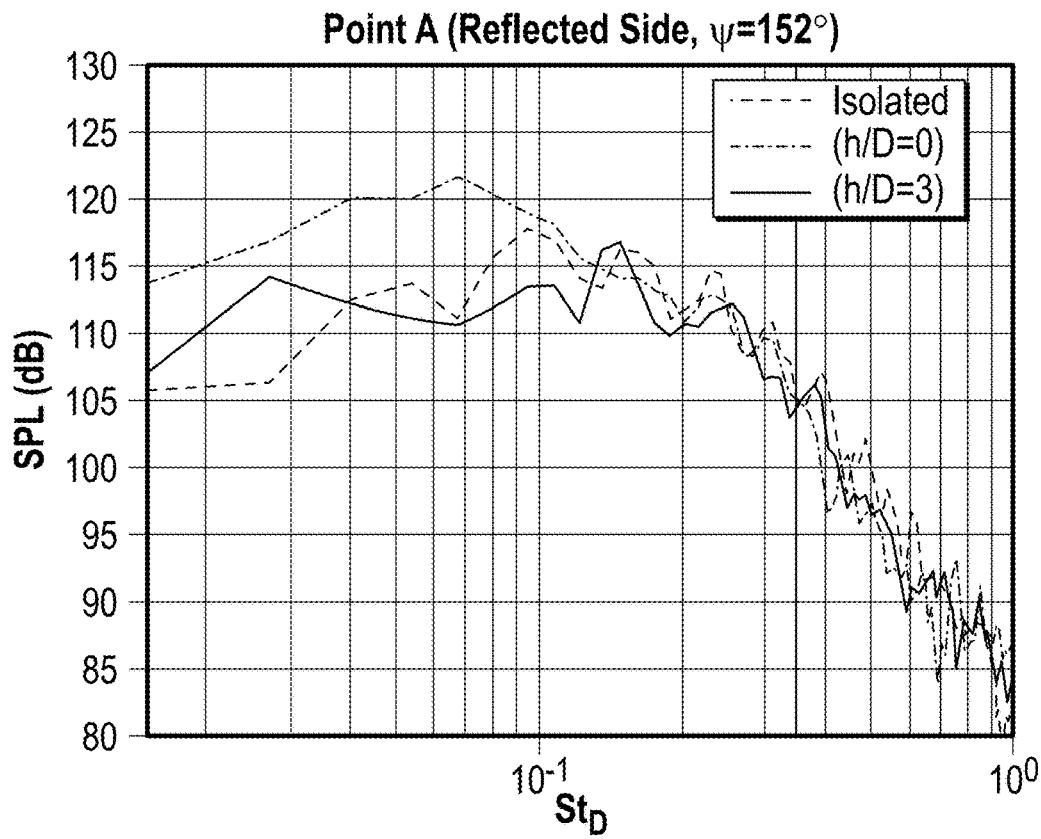
FIG. 16(a) and FIG. 16(b) show acoustic spectra at ψ=152° (a) reflected (A), and (b) shielded side (A'), with an isolated Jet and flat plate at h/D=0, and h/D=3.
Figure 16B:
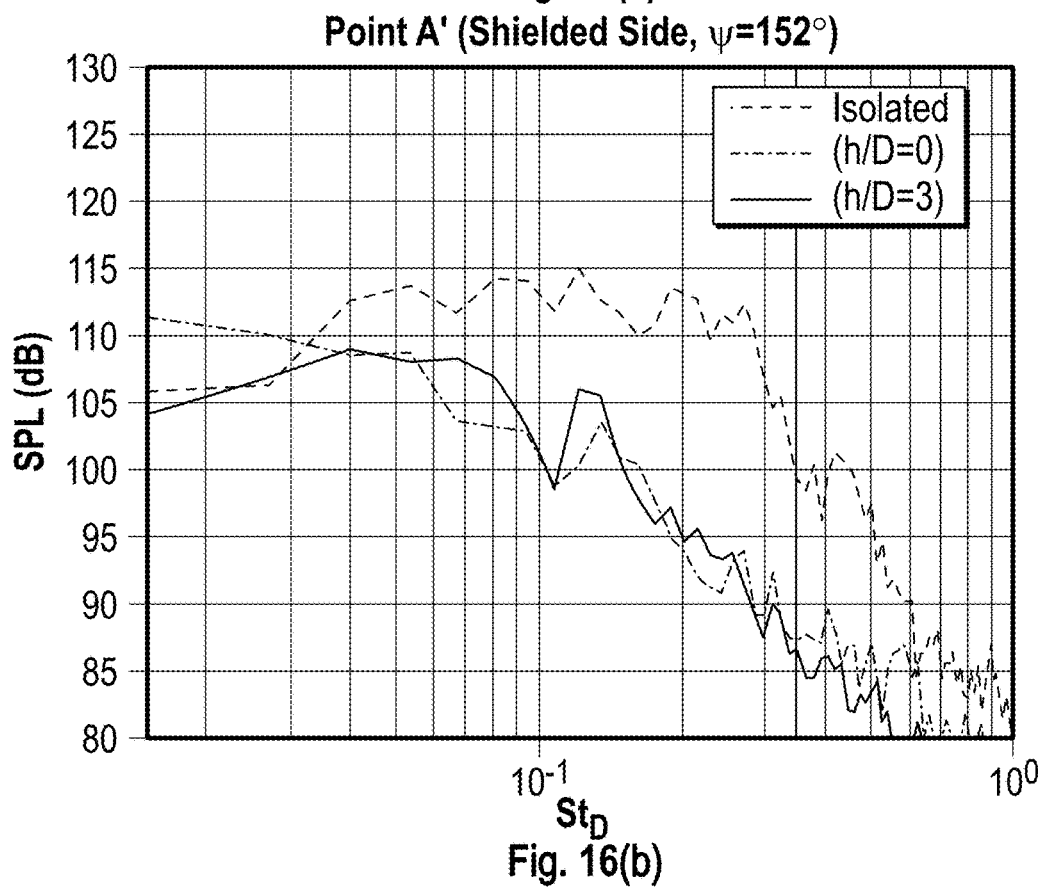

Most of the reflected noise increase is observed in just the lower frequency, while the noise increase is observed for the entire range of spectral frequencies for the (h/D=0). It can be concluded that, in the (h/D=3) case, the noise increase in the reflected side is mainly due to interaction of the reflected waves with the jet flow 36 and energizing the noise sources in the shear layer. On the other hand, the wall jet flow in the (h/D=0) case, not only has the same mechanism involved, it also introduces the trailing edge noise source as an additional source of noise that increases the reflected side noise more drastically. To visualize the effect of (h/D), the acoustic results for the isolated Jet, flat plate at h/D=0, and h/D=3 are plotted together in FIG. 16(a) for the reflected side and in FIG. 16(b) for the shielded side.

The acoustic data from numerical investigations suggest that, although the flat plate design provides the reliable acoustic shielding effect in the shielded direction. However, the noise level increase in the reflected side, makes these approaches less attractive to be implemented as a fixed design for a practical engine top configuration. Hence, modifications in the shielding plate profile is suggested here to improve the noise reduction of the shielding wall in both directions.

The main objective is to introduce disturbances to reduce the noise. To do this, the (h/D) parameter are sought to be limited to 0 and 3 for two reasons: (1) to be able to distinguish the effect of flow field vs. acoustic field. (2) to produce enough data to compare with corresponding experimental (and numerical) data for flat plate cases. Here the specifications of the wavy wall at (h/D=3) are discussed.

Figure 17A:
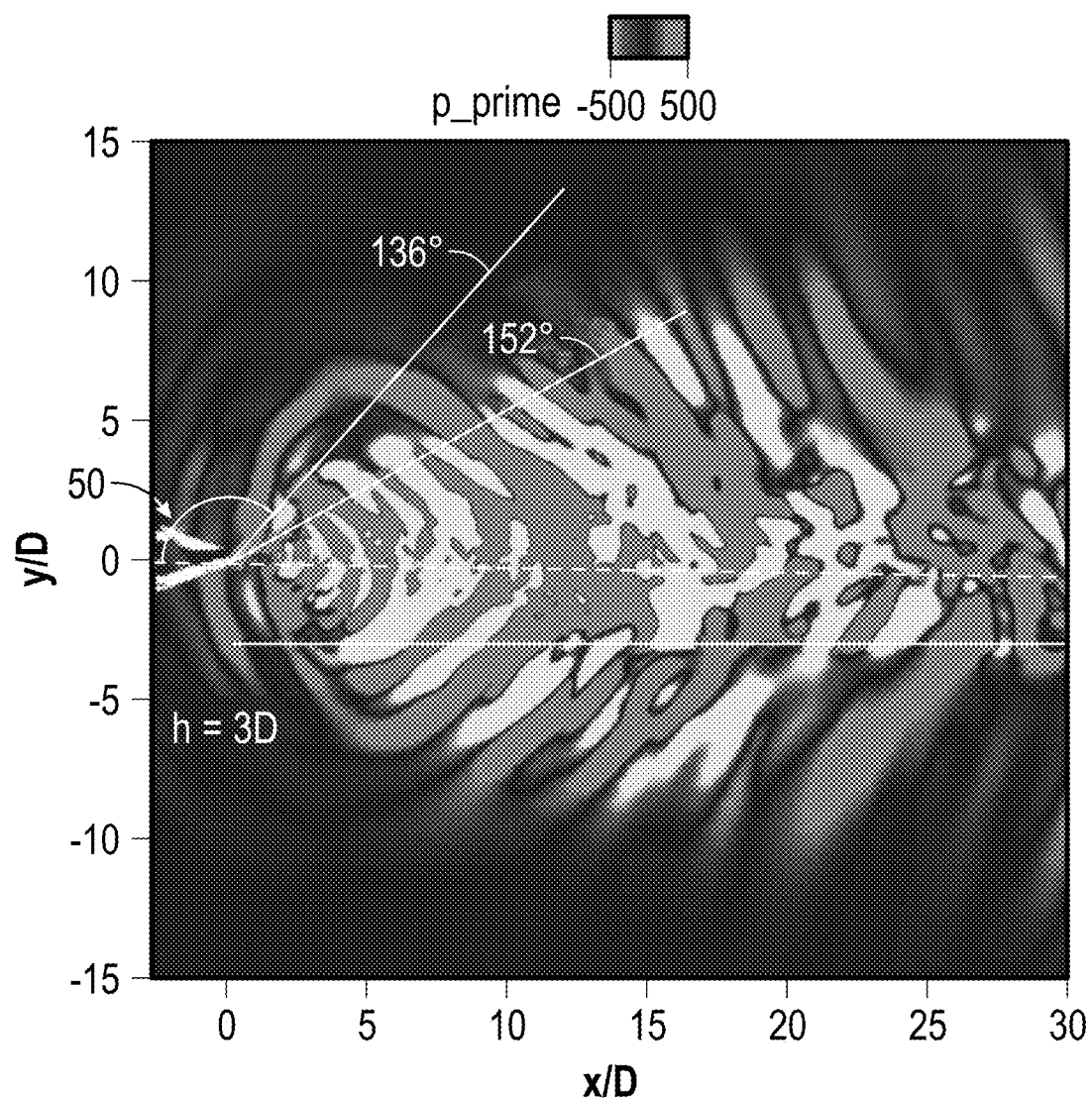
FIGS. 17(a)-(e) show (a) acoustic pressure field, and the measure line illustrations, and the acoustic signal along (b) ψ=136° line, (c) ψ=152° line, (d) x=3D line. (e) R.M.S of pressure fluctuations along x=3D line.
Figure 17B:
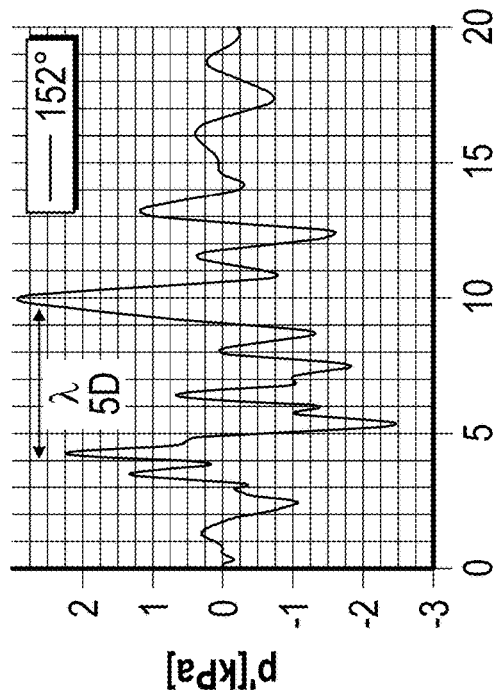
Figure 17C:
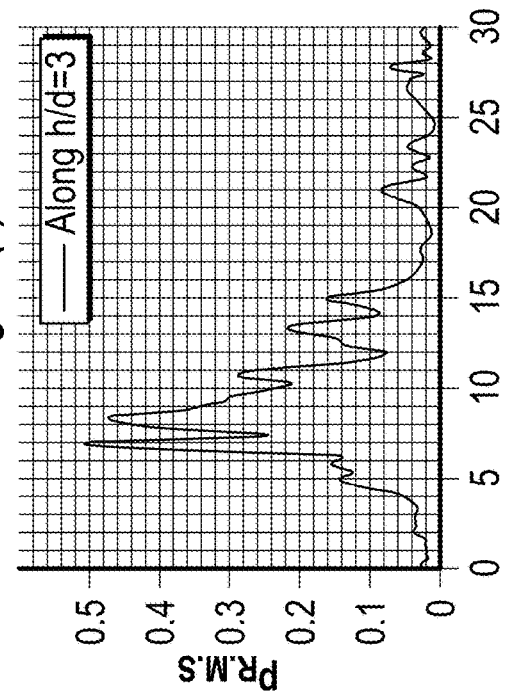
Figure 17D:
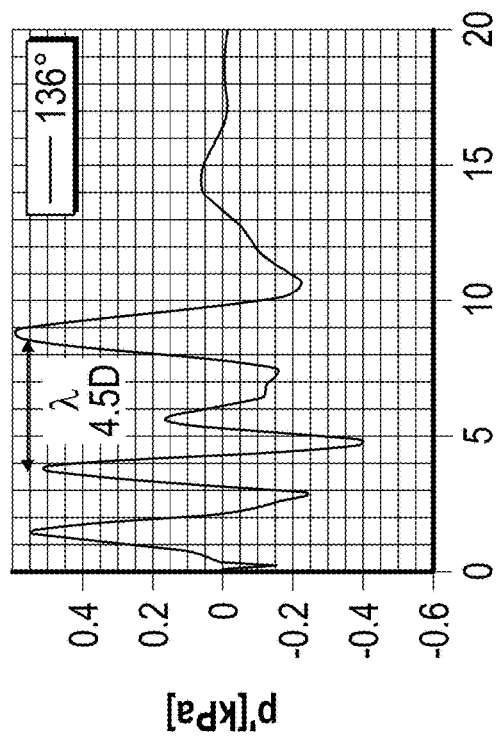
Figure 17E:
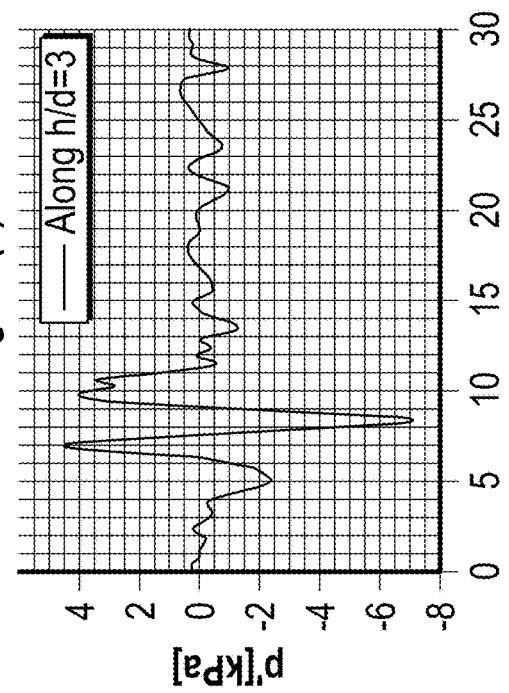

To identify the dominant the frequency and wavelength of the acoustic waves, the acoustic waves along the two main radiation angles of ψ=136°, and 152° measured from upstream of the jet axis are investigated. These radiation paths along with the horizontal line denoting the shielding plate are illustrated in FIG. 17(a) on the acoustic pressure field. The acoustic pressure wave signal along the main radiation angles of ψ=136°, and 152°, show that the waves have wavelengths of approximately around 4.5D-5D. This is consistent with the peak frequency observed previously in acoustic spectra (FIG. 16 (a)).

The spectra shows the peak frequency occurring at St=0.12~0.13, and since Strouhal number is defined as $St=fD_e/U_j$, for a wavelength defined as $\lambda=c/f$. One can easily calculate the corresponding wavelength as:

$$\lambda = \left[\frac{1}{MSt}\right]D \qquad (9)$$

Here, M is the isentropic jet exhaust Mach number. For the given peak frequencies, the wavelength would have a value of around 4.5 D-5 D. This calculation is consistent with the wavelengths observed in FIGS. 17 (b) and (c). Additionally, looking at the straight line at h=3D, where the shielding plate would possibly be located, similar wavelength is observed to pass this line, as illustrated in FIG. 17 (d). Moreover, The R.M.S of pressure fluctuations shown in FIG. 17 (e) suggests that the region of impact is somewhere around x/D=5.

The numerical results for the three wavy wall embodiments, i.e., wavy embodiment 1 (h/D=3, λ=5D, A=0.5D); wavy embodiment 2 (h/D=3, A=5D, A=0.05D); wavy embodiment 3 (h/D=3, λ=2.5D, A=0.05D), depicted in FIGS. 18(a)-(c) are compared with the flat plate 200 case. As indicated in FIGS. 19(a)-(d), the instantaneous pressure fluctuations, near field SPL, and the turbulent kinetic energy are investigated. FIGS. 19(a)-(d) illustrate instantaneous pressure fluctuations. FIGS. 19(a)-(d) illustrate that, embodiments 2 and 3 which have smaller amplitudes than embodiment 1, appear to somewhat control the reflections. While embodiment 1, amplifies the reflected waves.

Near field SPL is shown in FIGS. 20(a)-(d). The amplified reflected waves in embodiment 1 increase the near field SPL significantly. Also, these reflections impose perturbation in the jet flow 36 and amplify the noise source. However, embodiments 2 and 3 reduce the reflected waves. Embodiment 2 shows to be the most effective in reducing the noise, especially in the dominant radiation direction (downstream travelling waves).

The TKE contours shown in FIGS. 21(a)-(d), clearly show the effect of the reflected wave on the noise source. The amplified reflected waves in embodiment 1 increase the fluctuations in the maximum TKE region. Comparing embodiments 2 and 3 with the flat plate, embodiment 2 imposes more effective control on the turbulent structure when compared with the flat plat case, which explains the reduced SPL levels observed in FIGS. 20(a)-(d).

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

What is claimed is:

1. A method for suppressing noise generated by an aircraft engine, the method comprising:
   forming a noise suppression assembly, the noise suppression assembly including a non-linear profile suppressing surface including a plurality of surface features spaced along the suppressing surface;
   wherein the surface features comprise a series of protrusions, peaks and valleys, waves, undulations, or combinations thereof;
   connecting the noise suppression assembly to a fuselage of an aircraft to which the aircraft engine is mounted; and
   during aircraft engine operation, suppressing, via the noise suppression assembly, noise generated via a jet exhaust flow from the aircraft engine;
   wherein suppressing the noise generated by the jet exhaust flow from the aircraft engine comprises disrupting at least a portion of the jet exhaust flow as the jet exhaust flow passes along the suppressing surface and impacts the surface features, and introducing flow perturbations or disturbances into the jet exhaust flow sufficient to reflect acoustic waves generated by the jet exhaust flow at a frequency that is substantially harmonic to a frequency of radiated peak noise generated by the jet exhaust flow.

2. The method of claim 1, wherein connecting the noise suppression assembly to the aircraft's fuselage includes integrating the noise suppression assembly with the aircraft during aircraft manufacture.

3. The method of claim 1, wherein connecting the noise suppression assembly to the fuselage of the aircraft comprises positioning the noise suppression assembly along the fuselage with the aircraft engine at a distance from at least one nozzle assembly of the aircraft engine based on a ratio h/D of about 1 to about 3, wherein the ratio comprises a distance (h) from the at least one nozzle assembly of the aircraft engine to the noise suppression assembly in relation to a nozzle diameter (D) of the at least one nozzle assembly.

4. The method of claim 1, wherein forming the noise suppression assembly comprises forming the noise suppressing surface with a sinusoidal profile including a plurality of peaks and valleys configured to reflect the acoustic waves generated by the jet exhaust flow into acoustic waves of a selected frequency.

5. A method for suppressing noise generated by a jet exhaust flow of an aircraft engine, the method comprising:
   locating a noise suppression assembly along a fuselage of the aircraft adjacent the aircraft engine;
   wherein the noise suppression assembly comprises a suppressing surface having a wavy configuration including a plurality of spaced surface features arranged therealong;
   wherein the surface features comprise a series of protrusions, peaks and valleys, waves, undulations, or combinations thereof;
   during operation of the aircraft engine, disrupting at least a portion of the jet exhaust flow exiting the aircraft engine by passing the jet exhaust flow over the suppressing surface, and as the jet exhaust flow impacts against the surface features of the suppressing surface reflecting a plurality of acoustic waves generated by the jet exhaust flow;
   wherein the acoustic waves are reflected at a frequency that is substantially harmonic to a frequency of radiated peak noise generated by the jet exhaust flow.

6. The method of claim 5, further comprising forming the suppressing surface of the noise suppression assembly with a sinusoidal profile defined by $y_w = A\sin[k(xD) - \pi]$, wherein $k = 2\pi/\lambda$ comprises a wave number, and A comprises an amplitude of a wave.

7. The method of claim 5, wherein locating the noise suppression assembly along the fuselage of the aircraft comprises integrating the noise suppression assembly with a surface of a wing of the aircraft along which the aircraft engine is mounted.

8. The method of claim 5, wherein the jet exhaust flow comprises a supersonic air flow.

9. The method of claim 5, wherein locating the noise suppression assembly along the fuselage of the aircraft comprises positioning the noise suppression assembly behind one or more nozzle assemblies of a plurality of aircraft engines at a distance from the one or more nozzle assemblies based on a ratio of h/D of about 1 to about 3, wherein the ratio comprises a distance (h) from at least one nozzle assembly of at least one of the aircraft engines to the noise suppression assembly in relation to a nozzle diameter (D) of the at least one nozzle assembly.

* * * * *